US011300662B1

(12) United States Patent
Milton

(10) Patent No.: US 11,300,662 B1
(45) Date of Patent: Apr. 12, 2022

(54) DETECTING AND LOCATING INTERACTIONS USING LIDAR DEVICES

(71) Applicant: Amazon Technologies, Inc., Seattle, WA (US)

(72) Inventor: John Milton, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1018 days.

(21) Appl. No.: 15/391,823

(22) Filed: Dec. 27, 2016

(51) Int. Cl.
*G01S 7/48* (2006.01)
*G01S 17/10* (2020.01)
*G01S 17/87* (2020.01)
*G06Q 10/08* (2012.01)

(52) U.S. Cl.
CPC ............ *G01S 7/4802* (2013.01); *G01S 17/10* (2013.01); *G01S 17/87* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 5,960,413 A * | 9/1999 | Amon ...................... | G01S 5/163 235/385 |
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 9,473,747 B2 | 10/2016 | Kobres et al. | |
| 9,984,354 B1 * | 5/2018 | Chinoy ................ | G06Q 10/087 |
| 2003/0002712 A1 | 1/2003 | Steenburgh et al. | |
| 2004/0181467 A1 | 9/2004 | Raiyani et al. | |
| 2006/0238406 A1 * | 10/2006 | Nohara .................... | G01S 7/003 342/90 |
| 2007/0047600 A1 * | 3/2007 | Luo ........................ | H01S 3/0627 372/21 |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Hovhannes Baghdasaryan
(74) *Attorney, Agent, or Firm* — Athorus, PLLC

(57) ABSTRACT

LIDAR devices may be mounted in inventory areas and configured to transmit pulses or beams of laser light, to receive reflections of the laser light from one or more objects, and to detect and locate interactions with items maintained at the inventory areas. LIDAR devices may transmit laser light in fields that are substantially parallel to a frontal area of a storage unit, such that interactions with the storage unit via the frontal area are detected and located accordingly based on angles and times of flight of the reflected laser light. Other sensors, such as digital cameras or electronic scales, may be mounted within storage units, and information captured by such sensors may augment information captured by LIDAR devices to detect and locate interactions with the storage units.

20 Claims, 20 Drawing Sheets

(56) References Cited

U.S. PATENT DOCUMENTS

| | | | |
|---|---|---|---|
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0228062 A1* | 9/2008 | Zwirn | A61B 5/0046 600/407 |
| 2009/0121017 A1 | 5/2009 | Cato et al. | |
| 2009/0245573 A1 | 10/2009 | Saptharishi et al. | |
| 2010/0302528 A1* | 12/2010 | Hall | G01C 1/04 356/5.01 |
| 2011/0011936 A1 | 1/2011 | Morandi et al. | |
| 2012/0284132 A1 | 11/2012 | Kim et al. | |
| 2013/0076898 A1 | 3/2013 | Philippe et al. | |
| 2013/0253700 A1 | 9/2013 | Carson et al. | |
| 2014/0267776 A1* | 9/2014 | Duthu | G06Q 10/087 348/169 |
| 2014/0279294 A1 | 9/2014 | Field-Darragh et al. | |
| 2015/0019391 A1* | 1/2015 | Kumar | G07G 1/0036 705/28 |
| 2015/0052029 A1* | 2/2015 | Wu | G06Q 10/087 705/28 |
| 2015/0073907 A1 | 3/2015 | Purves et al. | |

OTHER PUBLICATIONS

Cristian Pop, "Introduction to the BodyCom Technology", Microchip AN1391, May 2, 2011, pp. 1-26, vol. AN1391, No. DS01391A, Publisher: 2011 Microchip Technology Inc.

\* cited by examiner

DETECTING AND LOCATING INTERACTIONS USING LIDAR DEVICES

BACKGROUND

Retailers, wholesalers, and other product distributors typically maintain an inventory of various items that may be ordered, purchased, leased, borrowed, rented, or viewed by one or more clients or customers in one or more materials handling facilities. For example, an e-commerce website may maintain inventory in a fulfillment center or other materials handling facility. When a customer orders an item, the item is picked from inventory, e.g., from an inventory area or storage area within the fulfillment center, and routed to a packing station, packed and shipped to the customer. Likewise, physical stores maintain inventory in customer-accessible inventory areas within which customers may locate items, e.g., on one or more storage units or fixtures such as shelves, gondolas, bins, racks, tiers, bars, hooks or other like systems, before retrieving the items from inventory and transporting the items to a cashier or other checkout station in order to execute one or more transactions for the items.

Despite recent advances in commercial technologies, methods for determining inventory levels or tracking interactions with or transactions in consumer goods at a materials handling facility are typically somewhat primitive. For example, an arrival of several items at a receiving station or like portion of a fulfillment center may be determined by scanning a bar code or set of alphanumeric characters or other markings disposed on an external surface of a container, or by otherwise identifying the container by manual or automatic means, and a record of inventory of the items may be generated or updated accordingly. Similarly, when one or more of the items are transferred from the receiving station to an inventory area at the fulfillment center, or removed from an inventory area and transferred to a distribution station at the fulfillment center for delivery to a customer, markings on external surfaces of the items may be scanned or interpreted, and a record of inventory of the items may be generated or updated accordingly. In a retail environment, a record of the placement of items in one or more inventory areas or on one or more storage units, e.g., by workers or other staff members, may be recorded on paper or using one or more handheld computer systems. The removal of the items from the one or more areas or facilities, e.g., by a customer, is typically confirmed by a cashier or at a checkout station, where names or identifiers of the items being removed may be determined by manual or automatic means, such as by manual entry of one or more characters into a keyboard or like input device, or by interpreting markings thereon using a stationary or mobile scanning system. Moreover, unless a worker or customer who handles the items identifies personally himself or herself, e.g., by logging into a handheld computer device, by providing his or her name to an attendant, or by using a payment instrument associated with himself or herself to purchase such items, the interactions with or transactions in each item will remain anonymous.

Currently, some systems and methods for hands-free tracking interactions with or transactions in consumer goods at a materials handling facility are limited in their effectiveness. Many such systems utilize imaging devices, such as digital cameras, depth sensors or the like, to capture imaging data, e.g., visual images in color, grayscale or black-and-white, of personnel and items with which such personnel may interact. Such imaging devices are typically mounted above or around an inventory area or a storage unit, e.g., above or around one or more shelves, gondolas, bins, racks, tiers, bars, hooks or other like systems, and used to monitor areas in which large numbers of items are stored, and through which any number of personnel such as workers, customers or others may pass. However, systems and methods that rely on imaging devices are usually expensive, heavy and large, and require substantial processing in order to effectively identify an item at the heart of a transaction or interaction, or to associate the item with one or more personnel. Moreover, where two or more transactions or interactions occur at a common angle with respect to a sensor of an imaging device, imaging data regarding the closest transaction or interaction may be captured, while more distant transactions or interactions will remain occluded by the closest transaction or interaction.

Furthermore, if an item associated with a transaction or interaction has one or more colors that are common or similar to those of its surroundings, e.g., colors of surfaces or components of a shelf, a gondola, a rack or another aspect of an inventory area or a storage unit, or clothing or skin tones of a worker or customer interacting with the item, visual data regarding the transaction or interaction may not readily be captured by an imaging device. Likewise, scales or other weight sensors have been associated with one or more surfaces of inventory areas, checkout stations or like regions, and used to detect changes in masses of items on such surfaces, which may then be associated with transactions in or interactions with one or more of such items. However, systems and methods that rely on scales or other weight sensors are only able to determine that a change in mass has occurred, and are unable to distinguish between specific items associated with the change in mass. For example, where a shelf includes several items having masses of two, three, four and six pounds each, and a scale detects a twelve-pound reduction in mass, the scale is typically unable to determine whether the reduction in mass was due to the removal of six two-pound items, two six-pound items, or any other combination of two, three, four or six-pound items. Furthermore, standing alone, a scale is typically unable to associate a change in mass with any one person.

BRIEF DESCRIPTION OF THE DRAWINGS

The detailed description is set forth with reference to the accompanying figures. In the figures, a left-most digit(s) of a reference number identifies a figure in which the reference number first appears. The use of the same reference numbers in different figures indicates similar or identical items or features.

DETAILED DESCRIPTION

As is set forth in greater detail below, the present disclosure is directed to the use of light detection and ranging, or "LIDAR," techniques and technologies in detecting and locating interactions. More specifically, one or more implementations of the systems and methods of the present disclosure are directed to installing and operating LIDAR systems in materials handling facilities, either alone or in combination with one or more other sensors, to determine that an interaction with one or more items has occurred, to identify items involved in an interaction, or to associate an interaction and/or an item with an individual.

In some implementations, a materials handling facility may feature one or more LIDAR devices installed in discrete locations at the materials handling facility, e.g., within or near points of access to one or more inventory areas, e.g., a storage area, having one or more storage units therein. LIDAR devices may be used to generate a relatively thin detection field (or detection plane) of laser light typically having a thickness of less than approximately one millimeter, and to capture reflections of the laser light in response to contact with or breaches of the detection field. When an arm or other body part enters a storage unit or other portion of an inventory area, and contacts or breaches a detection field, a LIDAR device may determine both an angle (e.g., a bearing) from the LIDAR device to the contact or breach with respect to an axis or plane, and a distance from the LIDAR device to the contact or breach. Using the angle and the distance, and a position of the LIDAR device, a location of an interaction with the storage unit, such as a picking of an item from a storage unit, or a stowing of an item on the storage unit, may be determined independently or in concert with one or more other sensors, such as imaging devices (e.g., digital cameras), weight sensors (e.g., scales), or additional LIDAR devices. The LIDAR device may also determine angles or distances to objects being deposited into or removed from the inventory area, along with any additional information including surface features, contours, textures or other aspects of such objects. Where information regarding a geometric arrangement of the inventory area is known, the location of the interaction may be associated with one or more items maintained at the inventory area based on information determined by the LIDAR device and one or more other sensors, and an interaction with or transaction in the one or more items may be predicted or determined to have occurred.

Figure 1A:
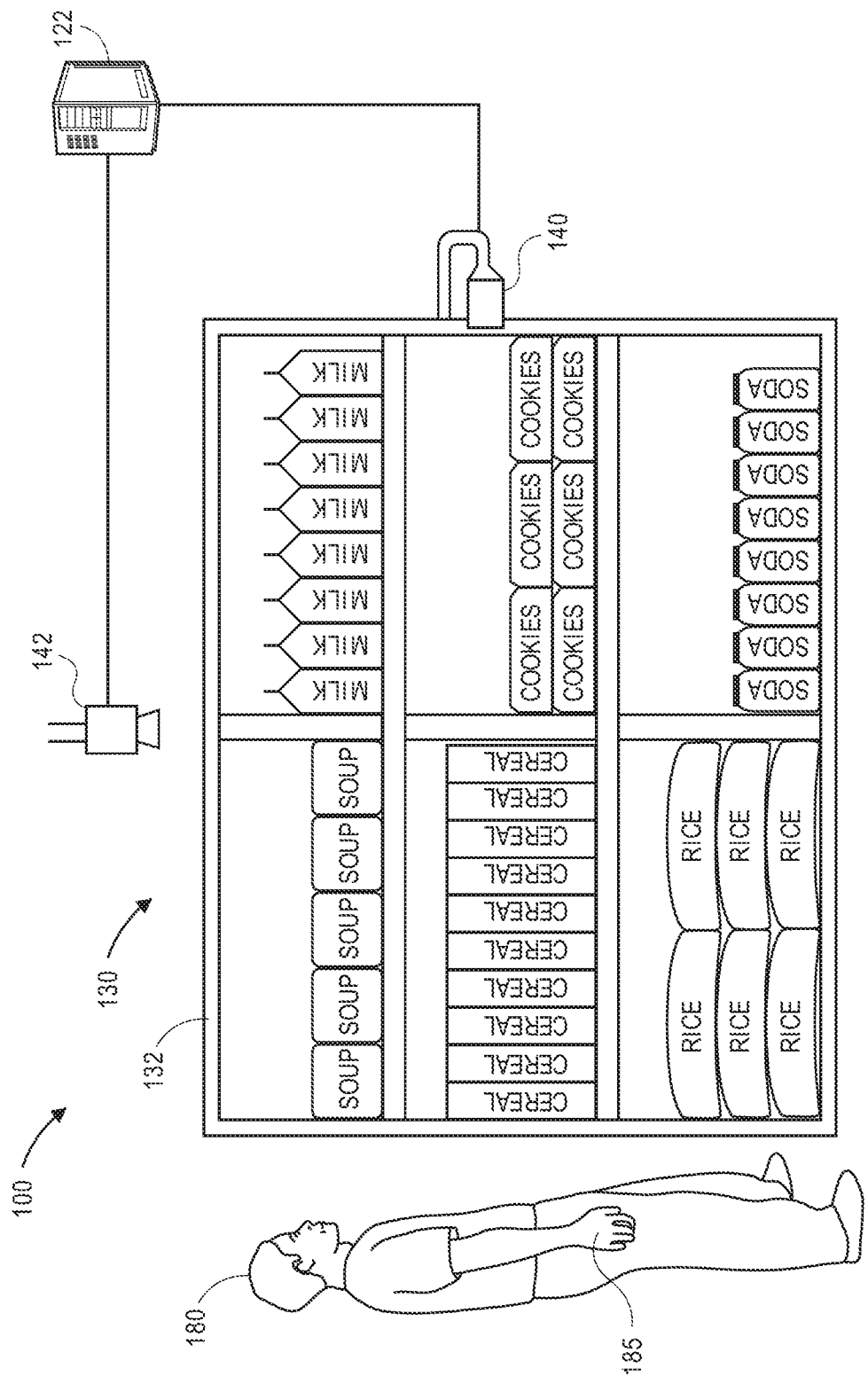
FIGS. 1A through 1G show components of a system configured for detecting and locating interactions using one or more LIDAR devices, according to one implementation of the present disclosure.
Figure 1B:
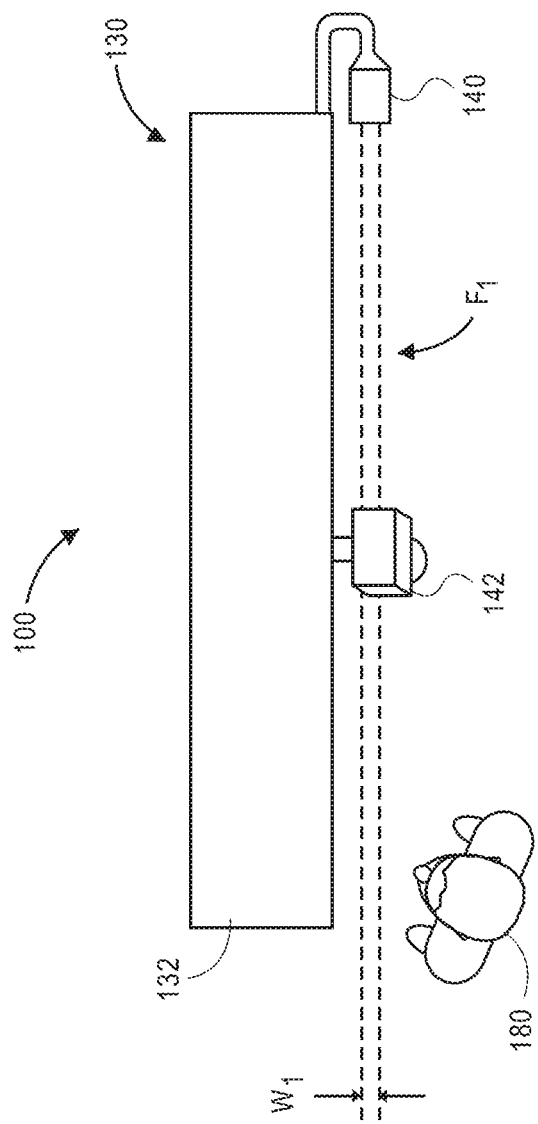

Referring to FIGS. 1A through 1G, a system 100 configured for detecting and locating interactions using one or more LIDAR devices is shown. FIG. 1A is a front view of the system 100, while FIG. 1B is a top view of the system 100. As is shown in FIGS. 1A and 1B, the system 100 includes a server 122, an inventory area 130, a LIDAR device 140, a depth sensor (or range camera) 142 and a user 180. The server 122 may be any type of computer device having one or more processors and/or data stores, and is in communication with the LIDAR device 140 and the depth sensor 142. The inventory area 130 may be a storage area or other portion of a materials handling facility having a storage unit 132 including shelves or other surfaces which may be horizontally flat or provided at one or more angles, and upon which items may rest or otherwise be stored. The depth sensor 142 may be any form of optical recording device (e.g., a digital camera, a range camera or depth sensor) that may be used to capture depth imaging data regarding any objects that are located in, around or near the inventory area 130. Alternatively, one or more imaging devices such as digital cameras that are configured to capture visual imaging data, e.g., color, grayscale or black-and-white imaging data, may be used in place of the depth sensor 142, or in addition to the depth sensor 142, and visual imaging data captured by such imaging devices may be utilized to determine or estimate ranges to objects, or to recognize the presence or absence of one or more objects within fields of view thereof.

The LIDAR device 140 may be any device that is configured to transmit pulses or beams of optically amplified light by the stimulated emission of electromagnetic radiation, or laser light, in a detection field, and to detect pulses or beams of the light detected from objects within the detection field, as well as the angles from which reflections of light from such pulses or beams were received, and to determine times of flight of the reflected pulses or beams between the transmission of such pulses or beams and the receipt thereof by the LIDAR device 140. In some implementations, the LIDAR device 140 may include one or more scanners or other systems for projecting laser light in pulses or beams within a detection field at various angles, and one or more sensors or other systems for receiving reflections of such light, with such systems including any number of fibers, transmitters, modulators, splitters, switches, expanders and/or receivers. Because the speed of light is substantially constant, ranges to objects from which the pulses or beams of light were reflected may be determined based on the speed of light and the times of flight of such pulses or beams. Therefore, the LIDAR device 140 may be used to determine positions of objects from which pulses or beams of light are reflected based on such angles and times of flight, with respect to a fixed position of the LIDAR device 140.

In some implementations, such as is shown in FIG. 1B, the LIDAR device 140 may be configured to transmit pulses or beams of light in two-dimensional detection fields, e.g., a detection field $F_1$, within the inventory area 130 that are parallel to a frontal area (e.g., a front face) or other access area of storage unit 132, in any number of directions, e.g., in any number of circumferential directions with respect to a position of the LIDAR device 140, and to receive reflections of such pulses or beams from objects from any of such directions. The widths $w_1$ of the pulses or beams transmitted by the LIDAR device 140 may be very small, i.e., approximately one millimeter (or 1.0 mm) or less, such as approximately one-half millimeter (or 0.5 mm), and may vary in width as a function of distance from the LIDAR device 140. Thus, the LIDAR device 140 may effectively generate a substantially thin detection field $F_1$ that may be used to detect interactions with items stored in the storage unit 132 based on breaches of the detection field $F_1$ by one or more workers, customers or other personnel, such as the user 180.

Figure 1C:
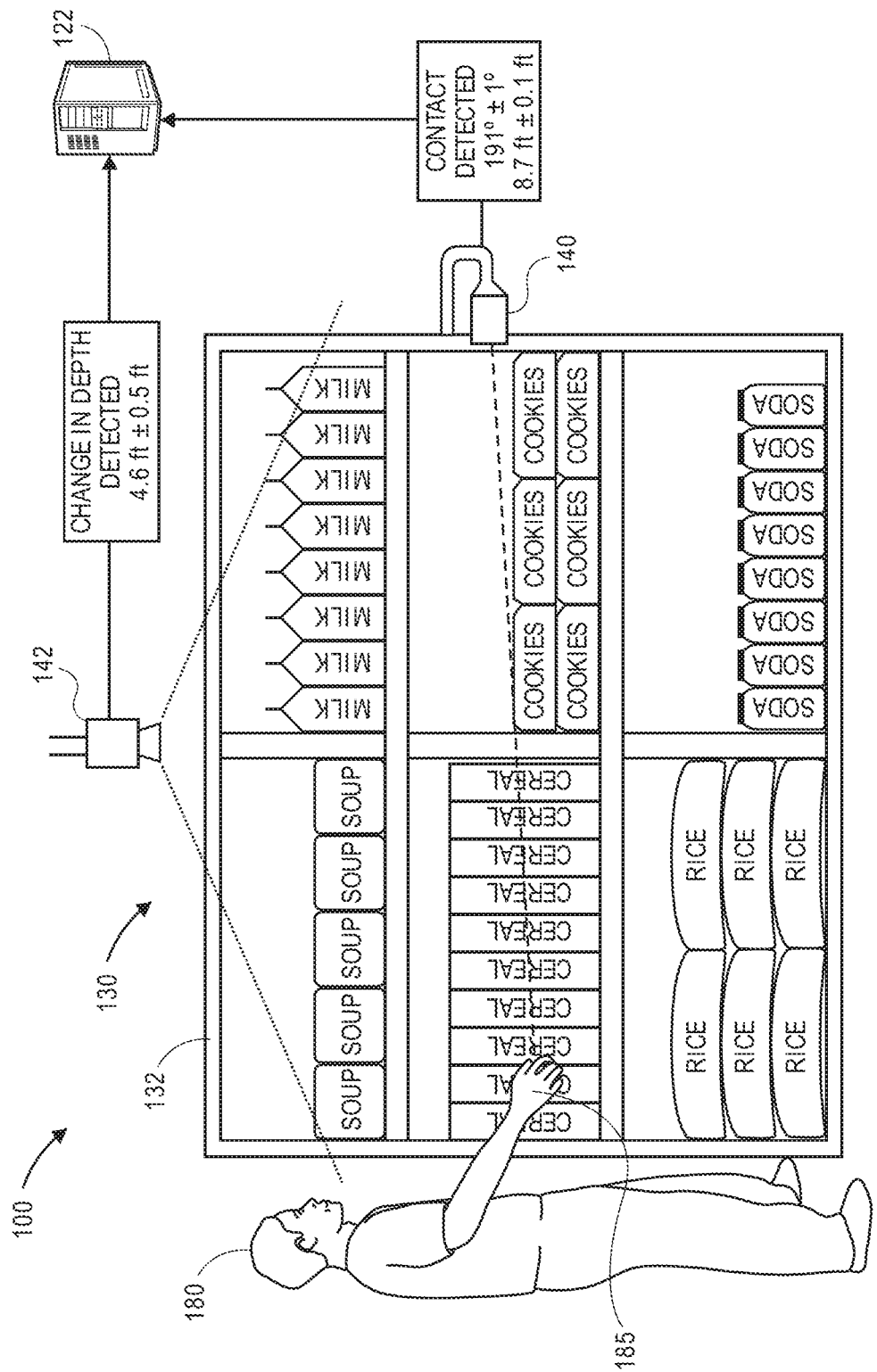
Figure 1D:
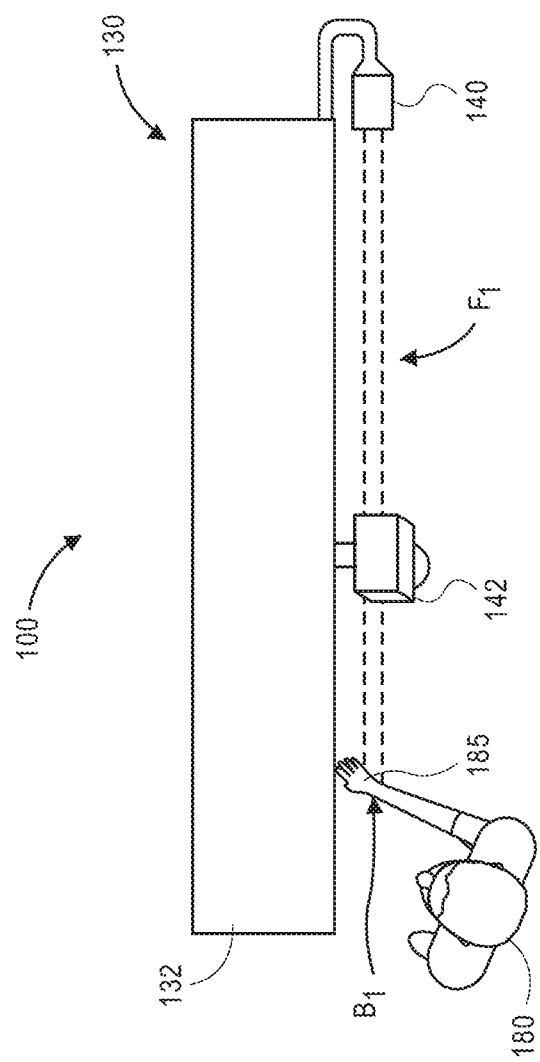

As is shown in FIGS. 1C and 1D, the user 180 attempts to interact with the storage unit 132, e.g., to remove an object from a shelf, or to place an object on the shelf, of the storage unit 132. For example, when the user 180 extends a hand 185 or other body part toward the storage unit 132, the presence of the hand 185 or other body part of the user 180 may be detected by both the LIDAR device 140 and the depth sensor 142. As is shown in FIG. 1C, the LIDAR device 140 determines that the hand 185 of the user 180 was extended into the shelving unit 132 thereby resulting in a breach $B_1$ of the detection field $F_1$ at a bearing of approximately one hundred ninety-one degrees (191°), plus or minus one degree (±1°), and at a range of approximately 8.7 feet, plus or minus one-tenth of one foot (0.1 ft). As is also shown in FIG. 1C, the depth sensor 142 detects the presence of an object at a distance of approximately 4.6 feet below the depth sensor 142, plus or minus one-half of one foot (0.5 ft).

Figure 1E:
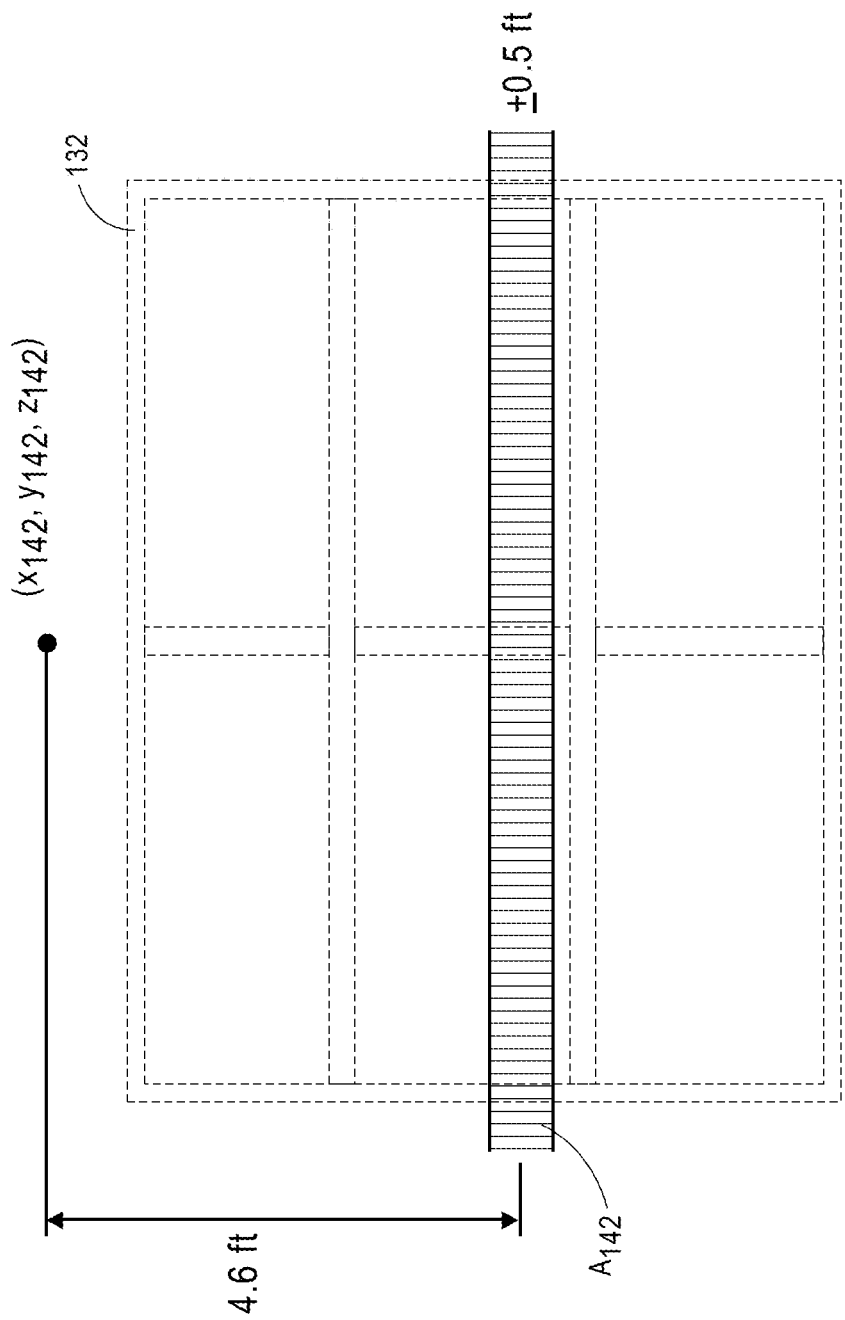
Figure 1F:
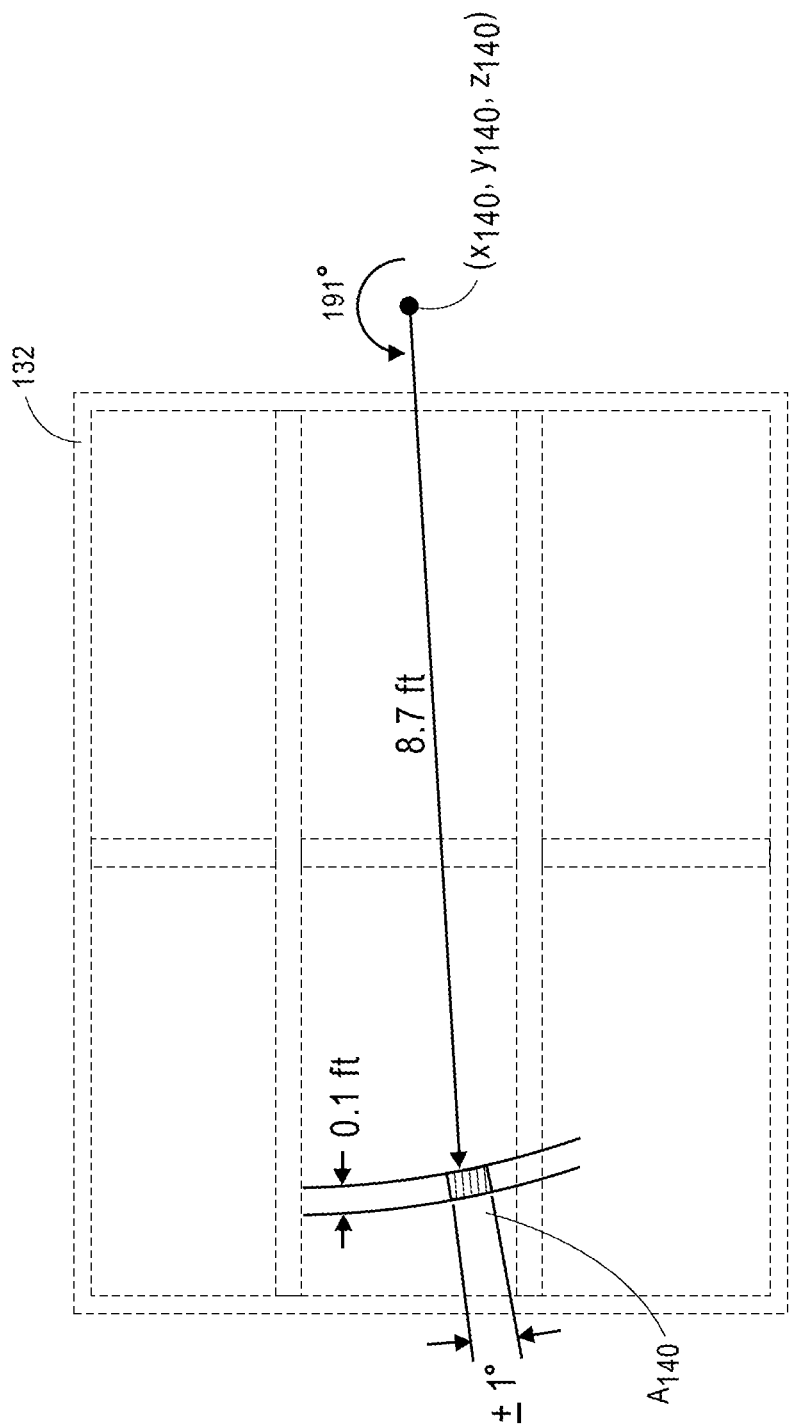

As is shown in FIGS. 1E and 1F, positions associated with the interaction by the user 180 with the storage unit 132 may be estimated based on information or data captured by the LIDAR device 140 and the depth sensor 142 regarding the breach $B_1$ of the detection field $F_1$. As is shown in FIG. 1E, the distance to the breach $B_1$ of the detection field $F_1$ sensed by the depth sensor 142 as shown in FIG. 1C and FIG. 1D corresponds to an area of uncertainty $A_{142}$ in the form of a one-foot wide band (or ±0.5 ft) centered 4.6 feet from the position ($x_{142}$, $y_{142}$, $z_{142}$) of the depth sensor 142. Within this band, the user 180 may be presumed to have reached into the storage unit 132, such as is shown in FIG. 1C and FIG. 1D, based on the information captured using the depth sensor 142. Similarly, as is shown in FIG. 1F, the bearing and range sensed by the LIDAR device 140 as shown in FIG. 1C and FIG. 1D correspond to an area of uncertainty $A_{140}$ in the form of an angular sector having a 0.2-foot thickness (or ±0.1 ft) that is centered 8.7 feet from the position ($x_{140}$, $y_{140}$, $z_{140}$) of the LIDAR device 140, at the bearing of one hundred ninety-one degrees (191°) from the LIDAR device 140, and having an angular width of two degrees (or ±1°).

Figure 1G:
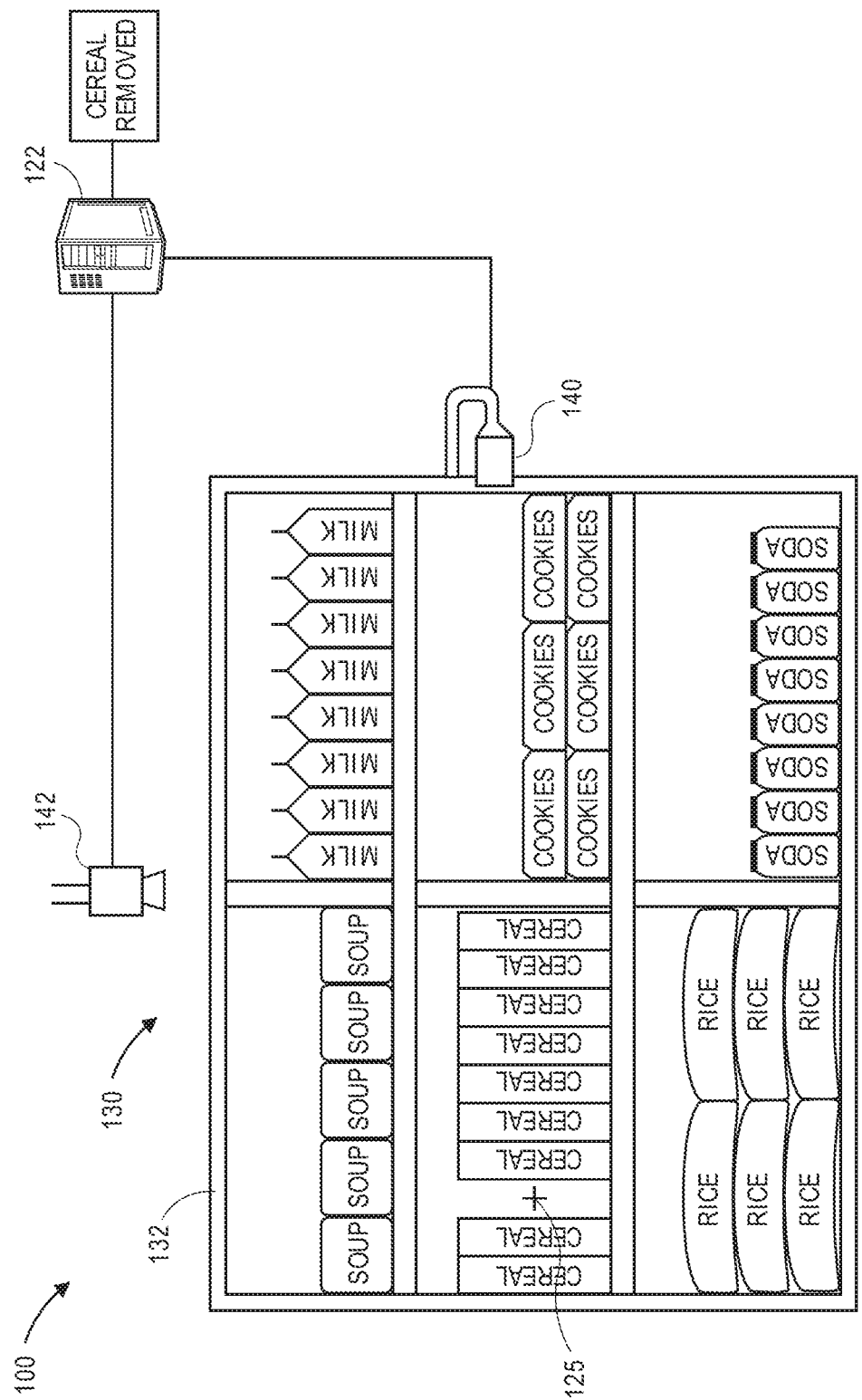

Based on the estimated positions determined using the information or data captured by the LIDAR device 140 and the depth sensor 142, namely, an intersection of the areas of uncertainty $A_{140}$, $A_{142}$ defined using information or data captured by the LIDAR device 140 and the depth sensor 142, a location of the hand 185 of the user 180 may be confirmed and associated with a corresponding location on the shelving unit 132. As is shown in FIG. 1G, it may be determined that an item, viz., a box of cereal, was removed from a corresponding location 125 on the storage unit 132, and one or more records of the levels of inventory at the inventory area 130 may be updated.

Accordingly, the systems and methods of the present disclosure may utilize information or data captured using a LIDAR device independently or, alternatively, along with information or data captured using one or more other sensors, to determine a location of an interaction with an inventory area or one or more facilities therein, and to make one or more predictions or determinations regarding such interactions, including but not limited to predicting or determining results of such interactions, or a status of the inventory area following such interactions.

In accordance with the present disclosure, LIDAR devices may be mounted in various locations of an inventory area, such as by permanently or releasably embedding the LIDAR devices into surfaces, supports or other components of the inventory area, and in any orientation, e.g., above, below, alongside or within one or more access points, access areas or access volumes of the inventory area where interactions initiated by workers, customers or other personnel may be anticipated. In some implementations of the present disclosure, LIDAR devices may be fixed or configured for motion about one or more degrees of freedom, e.g., by translating the LIDAR devices in one or more directions, or by rotating the LIDAR devices about one or more axes.

LIDAR devices may be configured to transmit pulses or beams of laser light at high transmission frequencies; in some implementations, a LIDAR device may be configured to transmit thousands of laser pulses or beams per second, e.g., over ten thousand beams of laser light per second. Additionally, LIDAR devices are configured to capture reflections of such pulses or beams, and to calculate times of flight between a transmission of a pulse or a beam, and a receipt of a reflection of the pulse or beam. The time of flight of a given pulse or beam may be multiplied by a speed of light, which is substantially constant at $3.0 \times 10^8$ meters per second, or 186,000 miles per second, to determine a distance traveled by the pulse or beam, half of which represents a distance to an object from which the pulse or beam was reflected. LIDAR devices typically include laser light sources, e.g., sources for generating light at discrete wavelengths, as well as photodetectors, e.g., solid state detectors and/or photomultipliers, for capturing and interpreting reflected pulses or beams of the laser light, and any number of optical components, switches, filters, analyzers, processors or other components. In some implementations, the laser light is emitted by a Food & Drug Administration (FDA) Class I laser device at infrared wavelengths, e.g., approximately 770-800 nanometers (nm), and at power levels of approximately three milliwatts (3 mW) or less, although laser light at other wavelengths and power levels may be used.

LIDAR devices may be configured to transmit pulses or beams of laser light, and to capture pulses or beams of laser light reflected from one or more objects, within fields (or planes) having finite or variable widths, typically of approximately one millimeter (or 1 mm) or less. Angles of the reflected pulses or beams, which may correspond to bearings to objects within such fields, may be determined with respect to an axis or plane, e.g., a horizontal axis or a vertical axis, and ranges to objects from which light in such pulses or beams are reflected may be calculated. Using the angles and ranges, and information regarding positions of the LIDAR devices, positions of objects within such fields from which the pulses or beams were reflected may be determined using standard trigonometric functions. Moreover, LIDAR devices may be installed in association with inventory areas or facilities therein in a manner that is intended to recognize contact with pulses or beams of light of the finite width, and to determine ranges and locations of such contact. Thus, where a storage unit includes one or more accessible areas or faces, e.g., a frontal area or other access area, one or more LIDAR devices may be configured to define a detection field in association with such areas or faces, e.g., by transmitting pulses or beams of light in a field that is parallel to one or more of such areas or faces, and capturing reflections of such pulses or beams as human operators (e.g., workers, customers or the like) extend or retract body parts into or out of the field. Information or data regarding the reflected pulses or beams may be used to identify locations within the field at which such interactions occurred. If information regarding inventory areas or facilities associated with the field is known, locations of interactions with the field, as determined using one or more LIDAR devices, may be associated with locations of items within the inventory areas or facilities. Where a location of contact with LIDAR light within a field, i.e., a breach or entry into the field, or departure from the field, is associated with a location of an item, the human operator may be assumed to have interacted with the item, any relevant information or data regarding the item or the interaction (e.g., an identifier of the item, a location of the interaction, or a time or time at which the breach, entry or departure was detected) may be stored in at least one data store.

One or more LIDAR devices may be used to generate a detection field associated within a storage unit in an inventory area, based at least in part on a baseline depth profile of a materials handling facility, which may be sometimes called a background model of the materials handling facility. For example, where a materials handling facility such as a fulfillment center includes a number of rows of shelves or other storage units that are fixed in their respective locations, detection fields may be established for such storage units in front of, behind and/or alongside such shelves. When a human operator attempts to place an item onto or remove an item from one of the shelves, and the human operator contacts or breaches one or more of the detection fields with one or both of his or her hands, a location where the human operator contacted or breached a detection field (e.g., a real or absolute position in three-dimensional space, such as in a Cartesian coordinate system) is determined based on an angle from a LIDAR device to the contact or breach by the human operator, a range from the LIDAR device to the contact or breach, and a position of the LIDAR device, and this location may be correlated with one or more items in a vicinity of the location. For example, where a human operator is determined to have inserted his or her hands into an access area of a shelf at point $(x_1, y_1, z_1)$, the human operator may be presumed to have interacted with one or more of the items that is nearest to the point $(x_1, y_1, z_1)$. The systems and methods of the present disclosure may identify or predict an item that was a subject or target of an interaction on any basis, and such systems and methods may be utilized in concert with one or more other systems and methods for identifying or tracking items or humans within a materials handling facility.

One or more of the systems and methods of the present disclosure may be further configured to filter out reflective noise captured by LIDAR devices and/or reflections from one or more structures, surfaces or objects within detection fields, including but not limited to floors, ceilings, walls or other fixed structures that do not correspond with hands, arms or other body parts of persons within a scene, or items being deposited at the scene or retrieved from the scene. Furthermore, where a transmission rate or frequency is sufficiently high, angles and ranges of reflections of light reflected from external surfaces of objects may be used to determine surface features, contours, textures or other aspects of items within detection fields, and to distinguish items from one another. For example, an item having an outer surface in the shape of a cylinder will reflect beams within a detection field in a manner that is different than items having outer surfaces in the shapes of cones or rectangular solids, or irregular shapes. Therefore, information or data captured by a LIDAR device regarding contact with or a breach of a detection field by an object may be used to further enhance processes by which an item is identified, or an interaction with the item is predicted or determined, in accordance with implementations of the present disclosure.

Furthermore, one or more LIDAR devices may be used to virtually define a shield or structure having two or more detection fields that is configured to recognize interactions with a storage unit or other aspect of a materials handling facility. For example, where an inventory area includes a table or other horizontal surface that may be accessed from areas above the table, in front of or behind the table, or on left and right sides of the table, one LIDAR device may be installed and configured to transmit pulses or beams in a substantially horizontal field above the table, while one or more other LIDAR devices may be installed and configured to transmit pulses or beams in substantially vertical fields around the table, such that any attempt to interact with the table, e.g., to retrieve one or more items therefrom, or to deposit one or more items thereon, will result in contact with or a breach of one or more of such fields. Information or data regarding such interactions or attempted interactions may be determined by one or more of the LIDAR devices accordingly. LIDAR devices may be mounted and configured to transmit pulses or beams in fields that are aligned at any angle, including two or more fields that are aligned in parallel to one another, and are not limited to transmitting pulses or beams in angles that are either vertical or horizontal.

In addition to LIDAR devices, inventory areas or storage units within a materials handling facility may be equipped with one or more other sensors for determining a location of an interaction with an inventory area or storage unit. For example, a shelf or other storage unit within an inventory area may be equipped with a weight sensor, a scale or another apparatus for determining masses of one or more items, e.g., a mass of an individual item on the shelf, or a mass of all of the items present on the shelf, which may be horizontally flat or provided at one or more angles. When a human operator is determined to have accessed the shelf to retrieve an item therefrom at a specific location, or to deposit an item thereon, and a number of items are located within a vicinity of the specific location, a change in the mass of all of the items present on the shelf may be determined, and one of the items within the vicinity of the specific location having a mass consistent with the determined change in the mass of all of the items present on the shelf may be presumed to have been retrieved or deposited thereon by the human operator.

Similarly, an inventory area may also be equipped with one or more imaging devices that are configured to capture imaging data in the vicinity of the inventory area, e.g., depth imaging data, or visual imaging data, at a time when a customer is determined to have retrieved an item from a shelf, a gondola or another storage unit in an inventory area, and a range, a color, a shape or other attribute of the item may be determined from the imaging data. The range, the color, the shape or the other attribute may be correlated with one or more of a plurality of items in the vicinity of the specific location at the time when the customer retrieved the item, and may be used to identify the item on that basis. Additionally, imaging data captured by imaging devices mounted within a vicinity of a storage unit may further be utilized to identify or recognize one or more human operators within an inventory area, in order to further identify or confirm an item that was retrieved from behind the virtual curtain.

The use of a LIDAR device along with one or more other sensors, including but not limited to weight sensors, imaging devices and/or other LIDAR devices, may be used to enhance the probability or accuracy of any other systems in which the hands-free tracking of interactions with or transactions in items is desired. Using an angle to contact with a detection field, a distance to the contact, and a position of a LIDAR device, a location of the contact may be determined independently or in concert with one or more other sensors, such as imaging devices (e.g., digital cameras), weight sensors (e.g., scales), or additional LIDAR devices. Some systems and methods of the present disclosure including one or more LIDAR devices may be provided in order to support or enhance any number of processes or methods that may be conducted within any type of materials handling facility. For example, the use of a LIDAR device along with one or more other sensors, including but not limited to weight sensors, imaging devices and/or other LIDAR devices, may be used to independently track interactions with or transactions in consumer goods in a hands-free manner, or to complement or augment existing systems for tracking interactions with or transactions in consumer goods. By mounting a LIDAR device in an orientation or configuration that is different from an orientation or configuration of one or more other sensors, e.g., weight sensors, imaging devices or other LIDAR devices, a level of redundancy may be obtained, and an interaction with or transaction in an item by a body part may be recognized even where the item or the body part are obscured or occluded from one or more of the sensors, e.g., by one or more other items or body parts.

Additionally, where LIDAR devices are used to define one or more detection fields in association with a set of shelves (e.g., a gondola) or another storage unit at a fulfillment center, information or data captured by the LIDAR devices, or by one or more other sensors, regarding locations accessed by one or more human operators, along with times at which such locations were accessed, may be used to determine an individual human operator's productivity or efficiency, as well as whether the human operator has complied with one or more established procedures. Similarly, where LIDAR devices are provided in association with a retail establishment such as a department store or a grocery store, information regarding locations accessed by a customer when retrieving an item from a shelf may be utilized in identifying one or more complements (e.g., accessories) to the item that may be recommended to the customer, while information regarding a location accessed by the customer when returning an item to a shelf may be utilized in identifying one or more substitutes (e.g., replacements) for the item that may be recommended to the customer.

As used herein, the term "materials handling facility" may include, but is not limited to, a warehouse, a distribution center, a cross-docking facility, an order fulfillment facility, a packaging facility, a shipping facility, a rental facility, a library, a retail store, a wholesale store, a museum, or another facility or combination of facilities for performing one or more functions associated with the handling of materials or inventory. As used herein, the term "inventory area" may include, but is not limited to, any area or location, such as an area or a location within a materials handling facility, where materials or inventory may be maintained, handled or stored for any period of time. As used herein, the term "storage unit" may include, but is not limited to, any structure or thing, such as a structure or thing within a materials handling facility, in which materials or inventory may be maintained, handled or stored for any period of time. In some instances, the terms "inventory area" and "storage unit" may be used interchangeably herein. For example, some implementations of the systems and methods disclosed herein may be utilized to detect interactions with an inventory area that does not include any storage units, e.g., where items are disposed on floors or other surfaces or areas that do not include any shelves, gondolas, bins, racks, tiers, bars, hooks or other like systems.

Figure 2:
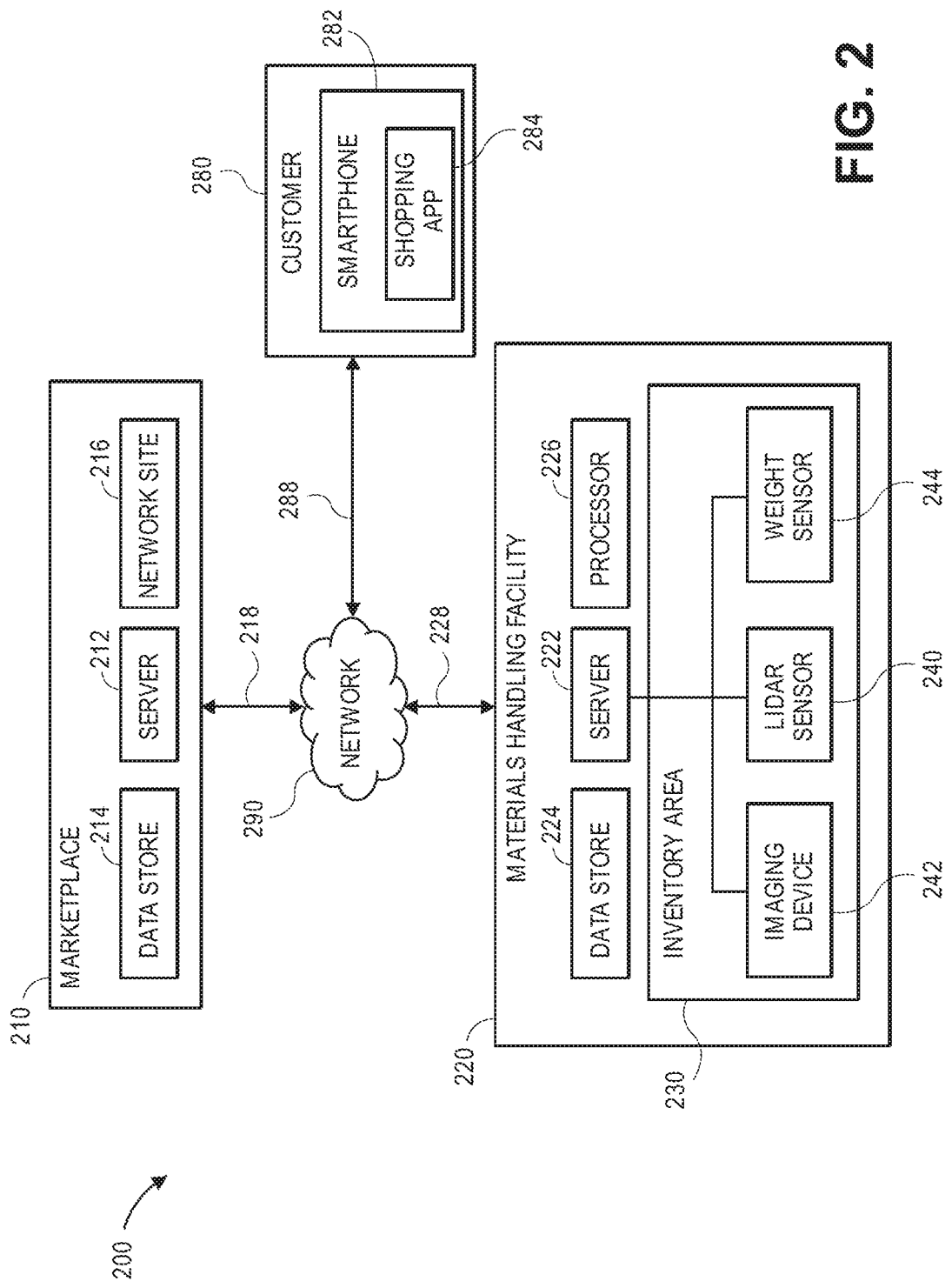
FIG. 2 shows a block diagram of one system configured for detecting and locating interactions using one or more LIDAR devices, according to an implementation of the present disclosure.

Referring to FIG. 2, a block diagram of a system 200 configured for detecting and locating interactions using one or more LIDAR devices according to an implementation of the present disclosure are shown. The system 200 includes a marketplace 210, a materials handling facility 220 and a customer 280 that are connected to one another across a network 290, such as the Internet. Except where otherwise noted, reference numerals preceded by the number "2" shown in FIG. 2 indicate components or features that are similar to components or features having reference numerals preceded by the number "1" shown in FIGS. 1A through 1G.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores (e.g., databases) 214 for hosting a network site 216 (e.g., a web site). The marketplace 210 may be physically or virtually associated with one or more materials handling facilities, including but not limited to the materials handling facility 220. The network site 216 may be implemented using the one or more servers 212, which connect or otherwise communicate with the one or more data stores 214 as well as the network 290, as indicated by line 218, through the sending and receiving of digital data. The servers 212 may cause the display of information associated with the network site 216 in any manner, e.g., by transmitting code such as Hypertext Markup Language (HTML), over the network 290 to another computing device or resource that may be configured to generate and render the information into one or more pages or to cause a display of such pages on a computer display of any kind. Moreover, the data stores 214 may include any type of information regarding items that have been made available for sale through the marketplace 210, or ordered by customers (e.g., the customer 280) from the marketplace 210. The servers 212 may further execute any type of computer-based function or compute any type or form of calculation, including but not limited to any formulas, equations, algorithms or techniques for determining one or more probabilities or performing any number of statistical tests.

The materials handling facility 220 may be any facility that is adapted to receive, store, process and/or distribute items on behalf of the marketplace 210. The materials handling facility 220 may be configured to receive any type or kind of inventory items from various sources, to store the inventory items until a user orders or retrieves one or more of the items, and to distribute the inventory items to the user. For example, inventory items such as merchandise, commodities, perishables or any other type of item may be received from one or more suppliers, e.g., manufacturers, distributors, wholesalers, vendors or the like, at the materials handling facility 220. Upon their arrival at the materials handling facility 220, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area 230 on an inventory shelf or other storage unit or like system that is sized and structured to safely accommodate such items. The inventory shelves, storage units or like systems may be flat or angled, stationary or mobile, and of any shape or size. In some implementations, all inventory items of a given type or kind may be stored in a common location within the inventory area 230. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 220, inventory items that are listed in the request or order, or are desired by the user, may be selected or "picked" from the inventory area 230. For example, in one implementation, a customer or other user may travel through the materials handling facility 220 with a list (e.g., a paper list, or a handheld mobile device displaying or including such a list) and may pick one or more of the inventory items from the inventory area 230. In other implementations, an employee of the materials handling facility 220 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within the inventory area 230 to another location. For example, in some instances, an inventory item may be picked from a first location (e.g., a first inventory shelf of a gondola or other storage unit) in the inventory area 230, moved a distance, and placed at a second location (e.g., a second inventory shelf of a gondola or other storage unit) in the inventory area 230.

As is shown in FIG. 2, the materials handling facility 220 includes a networked computer infrastructure for performing various computer-related functions associated with the receipt, storage, processing and distribution of such items, including one or more physical computer servers 222, databases (or other data stores) 224 and processors 226, that may be provided in the same physical location as the materials handling facility 220, or in one or more alternate or virtual locations, e.g., in a "cloud"-based environment. In some implementations, the servers 222, the data stores 224 and/or the processors 226 or any number of other computing devices or resources may further execute any type of computer-based function or compute any type or form of calculation, including but not limited to any formulas, equations, algorithms or techniques for determining one or more probabilities or performing any number of statistical tests.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The inventory area 230 may include one or more predefined two-dimensional or three-dimensional storage units, for accommodating items and/or containers of such items, such as aisles, rows, bays, shelves, gondolas, slots, bins, racks, tiers, bars, hooks, cubbies or other like storage means, or any other appropriate regions or stations, which may be flat or angled, stationary or mobile, and of any shape or size. Alternatively, the inventory area 230 need not include any such units, and may instead include floors or other spaces in which items may be openly received, stored and removed therefrom. Additionally, as is discussed above, the materials handling facility 220 may further include one or more receiving stations featuring any apparatuses that may be required in order to receive shipments of items at the materials handling facility 220 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 220 may further include one or more distribution stations where items that have been retrieved from a designated inventory area may be evaluated, prepared and packed for delivery from the materials handling facility 220 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 220 may be transferred directly to a distribution station for further processing, or "cross-docked," without first being placed into storage in an intermediate inventory area. The materials handling facility 220 may also include one or more additional stations for receiving and distributing items to customers, as well as one or more conveying systems, autonomous mobile robots, or other manual or automated vehicles for transporting items between such stations or areas (not shown in FIG. 2). The materials handling facility 220 may operate one or more order processing and/or communication systems using computer devices or resources in communication with one or more of the servers 222, the data stores 224 and/or the processors 226, or through one or more other computing devices or resources that may be connected to the network 290, as is indicated by line 228, in order to transmit or receive information in the form of digital or analog data, or for any other purpose.

The materials handling facility 220 further includes one or more LIDAR devices 240, one or more imaging devices 242 and one or more weight sensors 244, each of which may be in communication with the servers 222 or with one or more computer devices or resources within the materials handling facility 220 or elsewhere, e.g., over the network 290. The LIDAR devices 240 may be configured to transmit a plurality of pulses or beams of laser light at any wavelength and at any intensity, in accordance with any transmission frequency, and to capture and interpret reflections of such beams from one or more objects, within a detection field defined by the pulses or beams. In some implementations, the LIDAR devices 240 may transmit pulses or beams of laser light at infrared wavelengths or frequencies, and at power levels of less than five milliwatts, although laser light at other wavelengths and power levels may be used. The pulses or beams may be transmitted at any rate or transmission frequency, and in any direction or orientation.

The LIDAR devices 240 of the present disclosure may include any number of transmitting units or systems configured to transmit laser light at any polarization or intensity, as well as receiving units or systems for capturing laser light reflected from an object. The LIDAR devices 240 may further include one or more detection systems, optical components, and one or more processors or processing systems configured for interpreting the reflected laser light captured thereby. Additionally, the LIDAR devices 240 may be configured for mounting in any orientation or location within the inventory area 230, e.g., with respect to one or more points of access to the inventory area 230. For example, the LIDAR devices 240 may be integrated within or mounted to one or more shelving units or other loading surfaces of the inventory area 230, including above, below or alongside such shelving units. In some implementations, the LIDAR devices 240 may be configured to rotate about one or more axes or to translate in one or more directions, and to transmit pulses or beams within a detection field, and in any number of orientations with respect to the inventory area 230. Although the materials handling facility 220 of FIG. 2 includes a single box corresponding to one LIDAR device 240, those of ordinary skill in the pertinent arts will recognize that any number or type of LIDAR devices may be provided within the inventory area 230 or elsewhere in the materials handling facility 220 in accordance with the present disclosure.

The imaging devices 242 may be any form of optical recording device that may be used to photograph or otherwise record imaging data of structures, facilities or any other elements within the materials handling facility 220, as well as any items within the materials handling facility 220, or for any other purpose. The imaging devices 242 may include one or more sensors, memory or storage components and processors, and such sensors, memory components or processors may further include one or more photosensitive surfaces, filters, chips, electrodes, clocks, boards, timers or any other relevant features (not shown). The imaging device 242 may capture imaging data in the form of one or more still or moving images of any kind or form, as well as any relevant audio signals or other information, within one or more designated locations within the materials handling facility 220. In some implementations, one or more of the imaging devices 242 may be configured to capture depth imaging data, e.g., distances or ranges to objects within their respective fields of view. In some implementations, one or more of the imaging devices 242 may be configured to capture visual imaging data, e.g., visual images or image frames in color, grayscale or black-and-white.

For example, one or more of the imaging devices 242 may be a red, green, blue ("RGB") color camera, a still camera, a motion capture/video camera or any other type or form of camera. In other implementations, one or more of the imaging devices 242 may be depth-sensing cameras, such as a RGBD (or RGBz) camera. In still other implementations, one or more of the imaging devices 242 may be a thermographic or infrared (IR) camera. Additionally, in some implementations, the imaging devices 242 may simply be camera modules that include a lens and an image sensor configured to convert an optical image obtained using the lens of the camera into a digital signal or digital representation of the image (generally referred to herein as image data). In one implementation, the image sensor may be a RGB sensor capable of supporting an image resolution of at least 860×480 at six frames per second that may likewise be configured to provide image data to other components (e.g., a graphics processing unit) for processing. In some implementations, the imaging devices 242 may be paired to provide stereo imagery and depth information, and may include a pair of camera modules. Additionally, imaging data may be stored in any variety of formats including, but not limited to, YUYV, RGB, RAW, .bmp, .jpeg, .gif. or the like.

The imaging devices 242 also include manual or automatic features for modifying their respective fields of view or orientations. For example, one or more of the imaging devices 242 may be configured in a fixed position, or with a fixed focal length (e.g., fixed-focus lenses) or angular orientation. Alternatively, one or more of the imaging devices 242 may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 242, or changes in one or more of the angles defining the angular orientation.

For example, one or more of the imaging devices 242 may be hard-mounted to a support or mounting that maintains the device in a fixed configuration or angle with respect to one, two or three axes. Alternatively, however, one or more of the imaging devices 242 may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a substantially vertical field or about a horizontal axis (e.g., a pitch). Additionally, an imaging device may be rolled, or rotated about its axis of rotation, and within a field that is substantially perpendicular to the axis of rotation and substantially parallel to a field of view of the device.

Some of the imaging devices 242 may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the imaging data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Once the characteristics of stationary or moving objects or portions thereof have been recognized in one or more digital images, such characteristics of the objects or portions thereof may be matched against information regarding edges, contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of networks including one or more of the imaging devices 242, e.g., digital cameras, may be affected based on the lighting conditions and characteristics of the scenes in which the imaging devices 242 are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the materials handling facility 220 of FIG. 2 includes a single box corresponding to one imaging device 242, those of ordinary skill in the pertinent arts will recognize that any number or type of imaging devices may be provided within the inventory area 230 or elsewhere in the materials handling facility 220 in accordance with the present disclosure, including but not limited to digital cameras, depth sensors or range cameras, infrared cameras, radiographic cameras or other optical sensors.

The weight sensors 244 may be scales or other load sensors for determining extents of loading on one or more surfaces within the inventory area 230, as well as for sensing changes in such loading, e.g., by placing one or more items onto such surfaces or removing one or more items therefrom. The weight sensors 244 may include load cells, or load transducers, for converting sensed mechanical forces into measurable electrical signals. In some implementations, such load cells may be strain-gage load cells including a plurality of strain gages that are bonded onto a beam or structural member that deforms when weight is applied thereto. In some implementations, strain in a strain gage load cell may be measured using a Wheatstone Bridge or like circuit. The strain gages included in a load cell may be configured to sense both tension and compression in the beam or structural member, and may include multiple strain gages to improve their sensitivity to load and to compensate for temperature variations within a vicinity of the load cell. When a load cell is subjected to loads, the strain of the load cell causes the electrical resistance of the strain gages to vary in proportion to the loads. In other implementations, such load cells may be compression load cells that are configured to determine an extent of compressive forces applied thereon. Such cells may be integrated into or associated with a loading surface, e.g., a shelf, within the inventory area 230, or interposed between a loading surface and a support structure, e.g., a gondola.

In addition to the LIDAR devices 240, the imaging devices 242 and the weight sensors 244, the materials handling facility 220 may also include any number of other sensors, components or other features for controlling or aiding in the operation of the inventory area 230, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

The customer 280 may be any entity or individual that wishes to manually or automatically retrieve, evaluate and/or purchase one or more items maintained in the inventory area 230 of the materials handling facility 220, or to download, purchase, rent, lease, borrow or otherwise obtain items (e.g., goods, products, services or information of any type or form) maintained in the inventory area 230 from the marketplace 210. The customer 280 may utilize one or more computing devices, such as a smartphone 282 or any other like machine that may operate or access one or more software applications, such as a web browser (not shown) or a shopping application 224, and may be connected to or otherwise communicate with the marketplace 210, or the materials handling facility 220 through the network 290, as indicated by line 288, by the transmission and receipt of digital data. Moreover, the customer 280 may also receive deliveries or shipments of one or more items from facilities maintained by or on behalf of the marketplace 210, such as the materials handling facility 220.

Alternatively, or in addition to the customer 280, the materials handling facility 220 may also include one or more human operators (not shown), such as one or more workers, who may be any designated personnel tasked with performing one or more tasks within the materials handling facility 220 in general, or the inventory area 230 in particular. Such workers may handle or transport items (e.g., any type or form of good, product, media or other tangible consumer article) within the materials handling facility 220, or operate one or more pieces of equipment therein (not shown). The workers may also operate one or more specific computing devices or resources for registering the receipt, retrieval, transportation or storage of items within the materials handling facility 220, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices. In some implementations, such devices may include one or more wireless modules to facilitate communications with the server 222, or with one or more computer devices or resources, such as the server 212 or the smartphone 282, over the network 290, as well as a display (e.g., a touch-screen display) to facilitate the visible presentation to and interaction with a human operator. Such devices may be configured to store a unique identifier associated with a given human operator, and provide the unique identifier to the server 222 or to another computer device or resource in order to identify the human operator. In some implementations, a portable device may also include one or more other features, e.g., audio input/output peripherals or accessories, such as speakers or microphones, as well as video input/output peripherals or accessories, such as cameras, projectors, haptic peripherals, accessories such as keyboards, keypads, touchscreens, joysticks, control buttons, or other components. Such portable devices may operate in conjunction with or may otherwise utilize or communicate with one or more components of the materials handling facility 220.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "materials handling facility," or a "customer" (or "human operator" or "user") or like terms, may be automated steps performed by their respective computer devices or resources, or implemented within software modules (or computer programs) executed by one or more general purpose computers. Those of ordinary skill in the pertinent arts would also recognize that process steps described as being performed by a "marketplace," a "fulfillment center," or a "customer" (or "human operator" or "user") may be typically performed by a human, but could, alternatively, be performed by an automated agent.

The marketplace 210, the materials handling facility 220 and/or the customer 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages. For example, the server 222 may be adapted to transmit information or data in the form of synchronous or asynchronous messages from the materials handling facility 220 to the server 212, the smartphone 282 or any other computer device (e.g., any device having any number of other servers, data stores, processors or the like) in real time or in near-real time, or in one or more offline processes, via the network 290. Those of ordinary skill in the pertinent art would recognize that the marketplace 210, the materials handling facility 220 or the customer 280 may operate any of a number of computing devices or resources that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the server 212, the server 222, or the smartphone 282, or any other computers or control systems utilized by the marketplace 210, the materials handling facility 220 or the customer 280 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with a LIDAR device, which may control the transmission of pulses or beams of laser light, acknowledge the receipt of reflected light, and make any determinations regarding angles or bearings and distances to objects. In some other implementations, each of such functions or tasks may be executed by processors that are external to a LIDAR device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with the LIDAR device, while other functions or tasks may be executed by processors located in one or more other physical, alternate or virtual locations.

Although some of the implementations disclosed herein reference the use of LIDAR devices and/or other sensors, such as imaging devices, weight sensors and/or other LIDAR devices, to detect and locate interactions by human operators at a fulfillment center, a retail establishment or like facility, those of ordinary skill in the pertinent arts will recognize that the systems and methods disclosed herein are not so limited. Rather, LIDAR devices may be used independently or in conjunction with one or more other sensors to detect and recognize any number of interactions, in any environment, in accordance with the present disclosure, and one or more of the implementations of the systems and methods disclosed herein need not be limited for use in warehouses, department stores, grocery stores or the like.

Figure 3A:
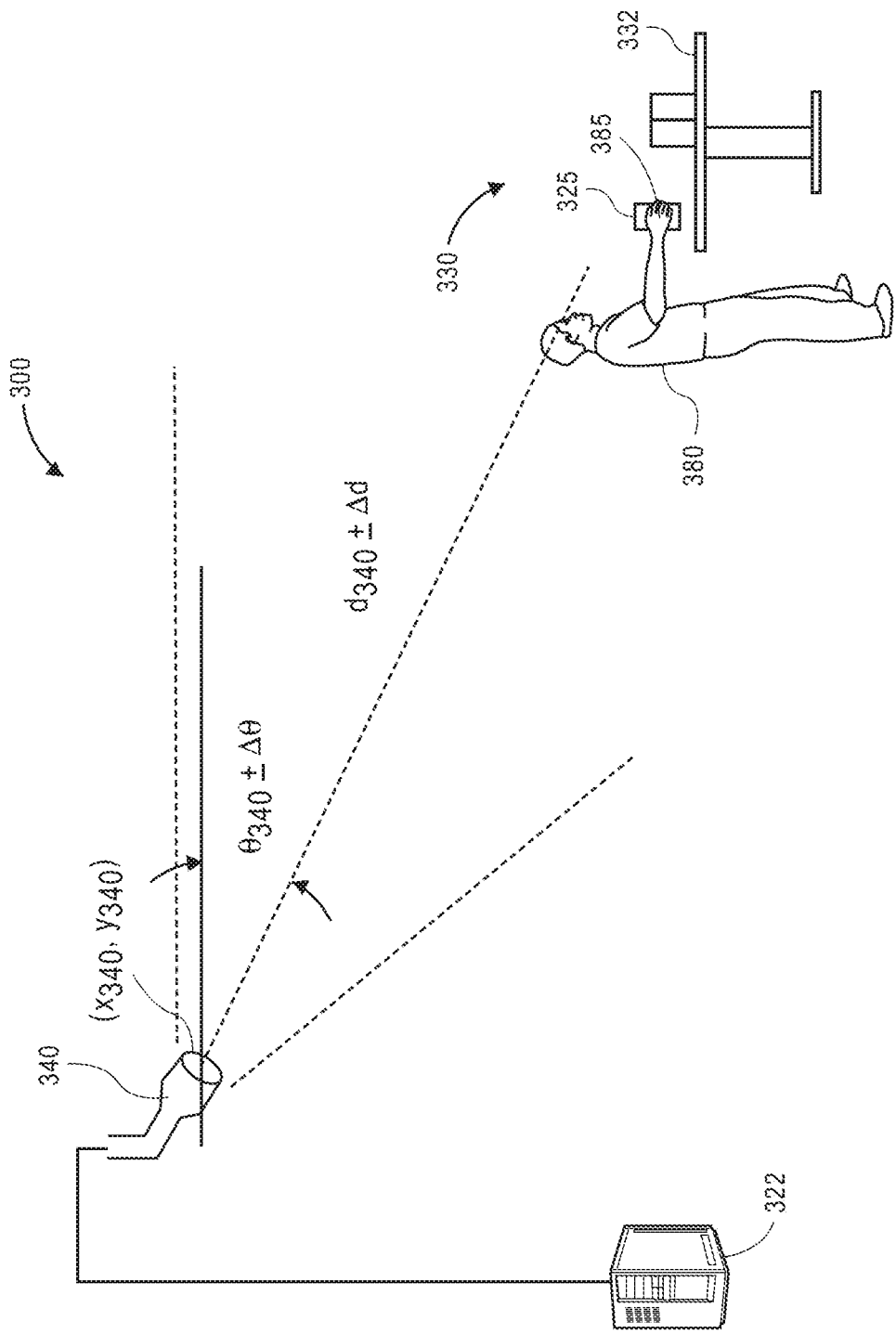
FIGS. 3A through 3C show components of one system configured for detecting and/or locating interactions using one or more LIDAR devices, according to one implementation of the present disclosure.
Figure 3B:
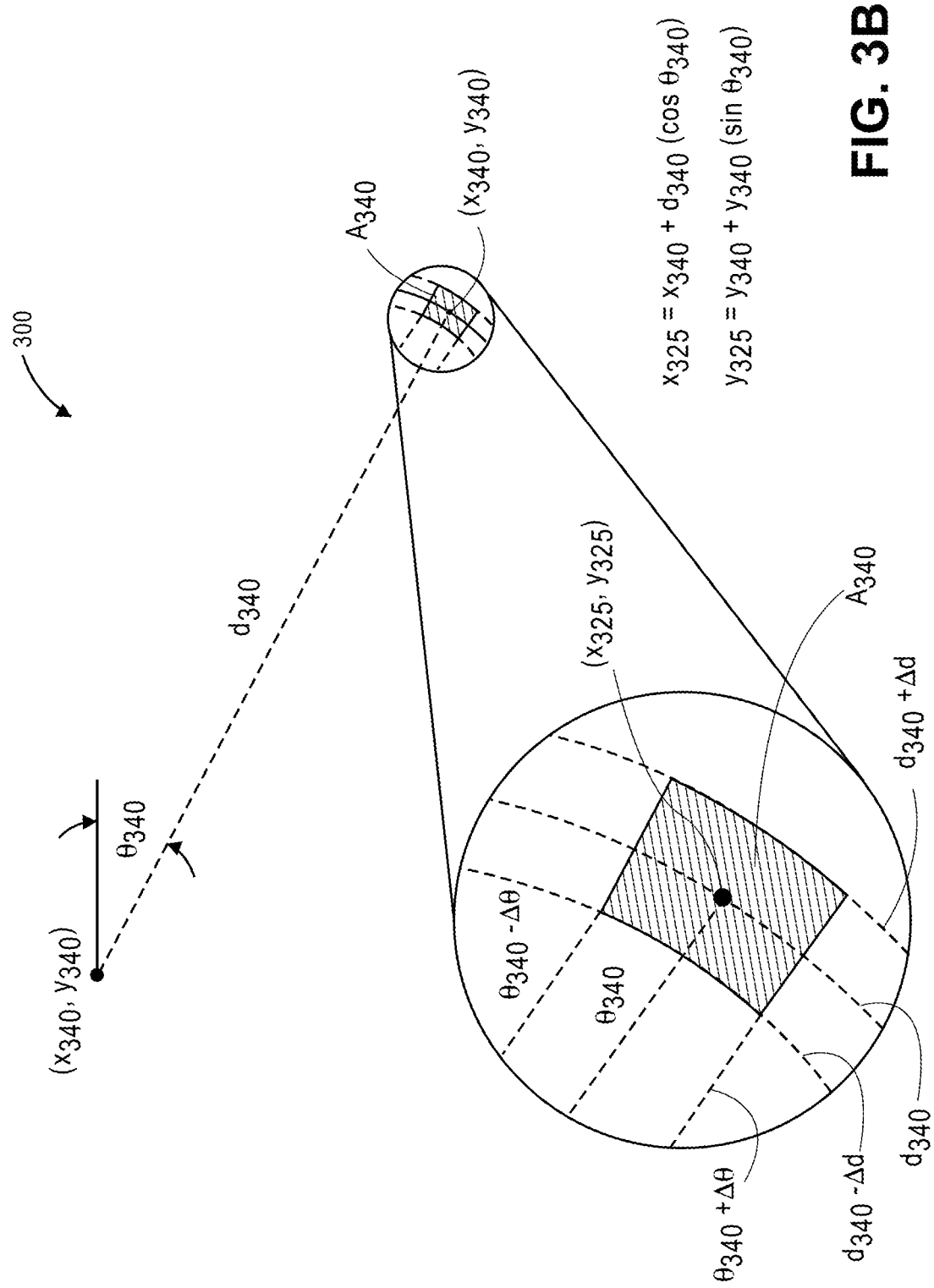
Figure 3C:
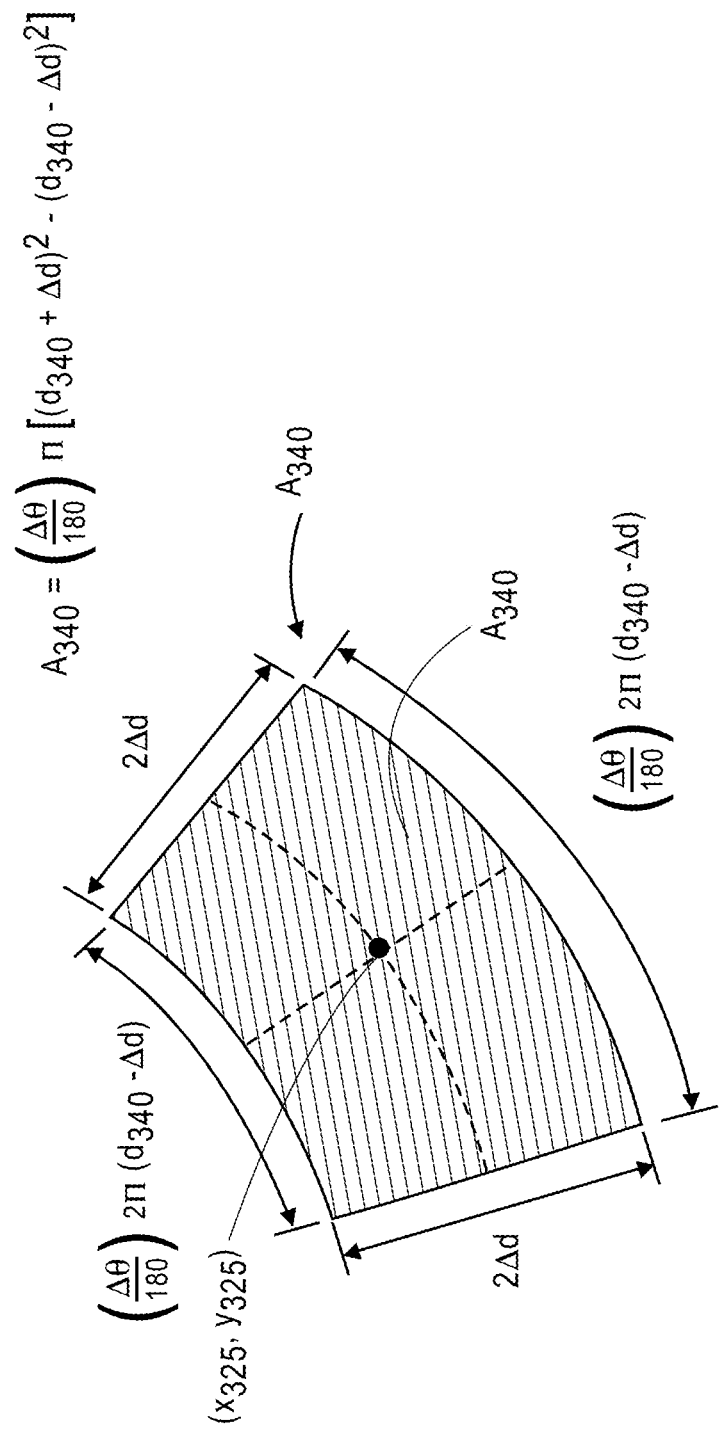

The use of one or more LIDAR devices to detect and locate an interaction according to one implementation of the present disclosure is shown in FIGS. 3A through 3C. Referring to FIGS. 3A through 3C, components of one system 300 that is configured for detecting and/or locating interactions using one or more LIDAR devices, according to one implementation of the present disclosure are shown. Except where otherwise noted, reference numerals preceded by the number "3" shown in FIGS. 3A through 3C indicate components or features that are similar to components or features having reference numerals preceded by the number "2" shown in FIG. 2 or by the number "1" shown in FIGS. 1A through 1G.

As is shown in FIG. 3A, the system 300 includes a server (or other computing resource) 322, an inventory area 330, a LIDAR device 340 and a user 380. The server 322 is in communication with the LIDAR device 340, which is aligned and configured to transmit a plurality of pulses or beams in directions of the inventory area 330 in a detection field having a finite width. The LIDAR device 340 is also aligned and configured to capture information or data regarding reflected pulses or beams that are reflected by one or more objects at the inventory area 330, e.g., any storage units or components such as aisles, rows, bays, shelves, gondolas, slots, bins, racks, tiers, bars, hooks, cubbies, or items stored or housed therein, as well as one or more body parts of the user 380, who is shown as retrieving an item 325 from a table 332 within the inventory area 330 by a hand 385.

In accordance with one implementation of the present disclosure, and as is shown in FIG. 3A, the LIDAR device 340 transmits a plurality of pulses or beams in any number of directions, including but not limited to directions of the user 380 and/or the item 325 retrieved by the user 380. The LIDAR device 340 may be configured to estimate an angle (or a bearing) $\theta_{340} \pm \Delta\theta$ from the LIDAR device 340 to the item 325 or the user 380, e.g., with respect to a horizontal axis or plane, and a range or distance $d_{340} \pm \Delta d$ from the LIDAR device 340 to the item 325 or the user 380, based on the pulses or beams that are reflected from the item 325 and/or the user 380 (e.g., the hand 385). For example, as is shown in FIG. 3B, a position $(x_{325}, y_{325})$ of the item 325 may be determined based on information or data obtained using the LIDAR device 340 and represented as an area of uncertainty $A_{340}$ defined by the estimated angle $\theta_{340}$ and distance $d_{340}$ to the item 325, as well as tolerances $\Delta\theta$, $\Delta d$ associated with the angle $\theta_{340}$ and the distance $d_{340}$, respectively. The tolerances $\Delta\theta$, $\Delta d$ may be known or estimated based on operating characteristics or features of the LIDAR device 340, one or more attributes of the inventory area 330, or any other factors.

In particular, and as is shown in FIG. 3B, the position $(x_{325}, y_{325})$ of the item 325 may be estimated based on geometric and/or trigonometric principles or equations, given the position $(x_{340}, y_{340})$ of the LIDAR device 340, the angle $\theta_{340}$ and the distance $d_{340}$ from the LIDAR device 340 to the item 325 and/or the user 380. The lateral or horizontal position of the item 325, or $x_{325}$, may be calculated based on a sum of the lateral or horizontal position of the LIDAR device 340, or $x_{340}$, and a product of the distance $d_{340}$ and the cosine of the angle $\theta_{340}$ to the item 325, or $x_{325} = x_{340} + d_{340}(\cos \theta_{340})$. The vertical position of the item 325, or $y_{325}$, may be calculated based on a difference between the vertical position of the LIDAR device 340, or $y_{340}$, and a product of the distance $d_{340}$ and the sine of the angle $\theta_{340}$ to the item 325, or $y_{325} = y_{340} - d_{340} (\sin \theta_{340})$. Alternatively, where the angle $\theta_{340}$ is determined with respect to a vertical axis or plane, the lateral or horizontal position of the item 325, or $x_{325}$, may be calculated based on a sum of the lateral or horizontal position of the LIDAR device 340, or $x_{340}$, and a product of the distance $d_{340}$ and the sine of the angle $\theta_{340}$ to the item 325, or $x_{325} = x_{340} + d_{340}(\cos \theta_{340})$, while the vertical position of the item 325, or $y_{325}$, may be calculated based on a difference between the vertical position of the LIDAR device 340, or $y_{340}$, and a product of the distance $d_{340}$ and the cosine of the angle $\theta_{340}$ to the item 325, or $y_{325} = y_{340} - d_{340}(\sin \theta_{340})$.

As is shown in FIG. 3C, dimensions associated with the area of uncertainty $A_{340}$ associated with the position $(x_{325}, y_{325})$ of the item 325 that is estimated based on information or data captured using the LIDAR device 340 may also be calculated according to standard geometric and/or trigonometric principles or equations. The area of uncertainty $A_{340}$ is in a shape of an annular sector defined by the tolerances associated with the angle $\theta_{340}$ and the distance $d_{340}$. For example, as is shown in FIG. 3C, the area of uncertainty $A_{340}$ is bounded by a pair of straight (e.g., radial) sides having lengths defined by twice the tolerance associated with the distance $d_{340}$, or $2\Delta d$, and by a pair of arcuate (e.g., circumferential) segments having lengths defined by circumferences of circles over angles of twice the tolerance associated with the angle $\theta_{340}$, or $2\Delta\theta$. Such circumferences may be calculated for circles having radii of $d_{340} + \Delta d$ and $d_{340} - \Delta d$, respectively. Thus, the lengths of the arcuate segments are $(\Delta\theta/180) \cdot 2\pi \cdot (d_{340} + \Delta d)$ for the outer arcuate segment and $(\Delta\theta/180) \cdot 2\pi \cdot (d_{340} - \Delta d)$ for the inner arcuate segment, respectively.

Additionally, the size of the area of uncertainty $A_{340}$ may be determined based on an area of the annular sector, which may itself be determined based on a difference in the areas of the circles having the radii of $d_{340} + \Delta d$ and $d_{340} - \Delta d$, respectively, and twice the tolerance associated with the angle $\theta_{340}$, or $2\Delta\theta$. Thus, the size of the area of uncertainty $A_{340}$ is $(\Delta\theta/180) \cdot \pi \cdot [(d_{340} + \Delta d)^2 - (d_{340} - \Delta d)^2]$.

As is discussed above, information or data regarding an object that is captured using a LIDAR device, e.g., an angle from the LIDAR device to the object, and a range from the LIDAR device to the object, may be utilized along with information or data regarding the object that is captured or otherwise obtained using one or more other sensors to further detect that an interaction has occurred, to locate the interaction, or to identify or classify the interaction. Such other sensors may include an imaging device (e.g., a digital camera, a depth sensor or range camera, an infrared camera), a weight sensor (e.g., a scale or like system having one or more load cells for determining loads or changes in loads), or one or more other LIDAR devices.

Figure 4:
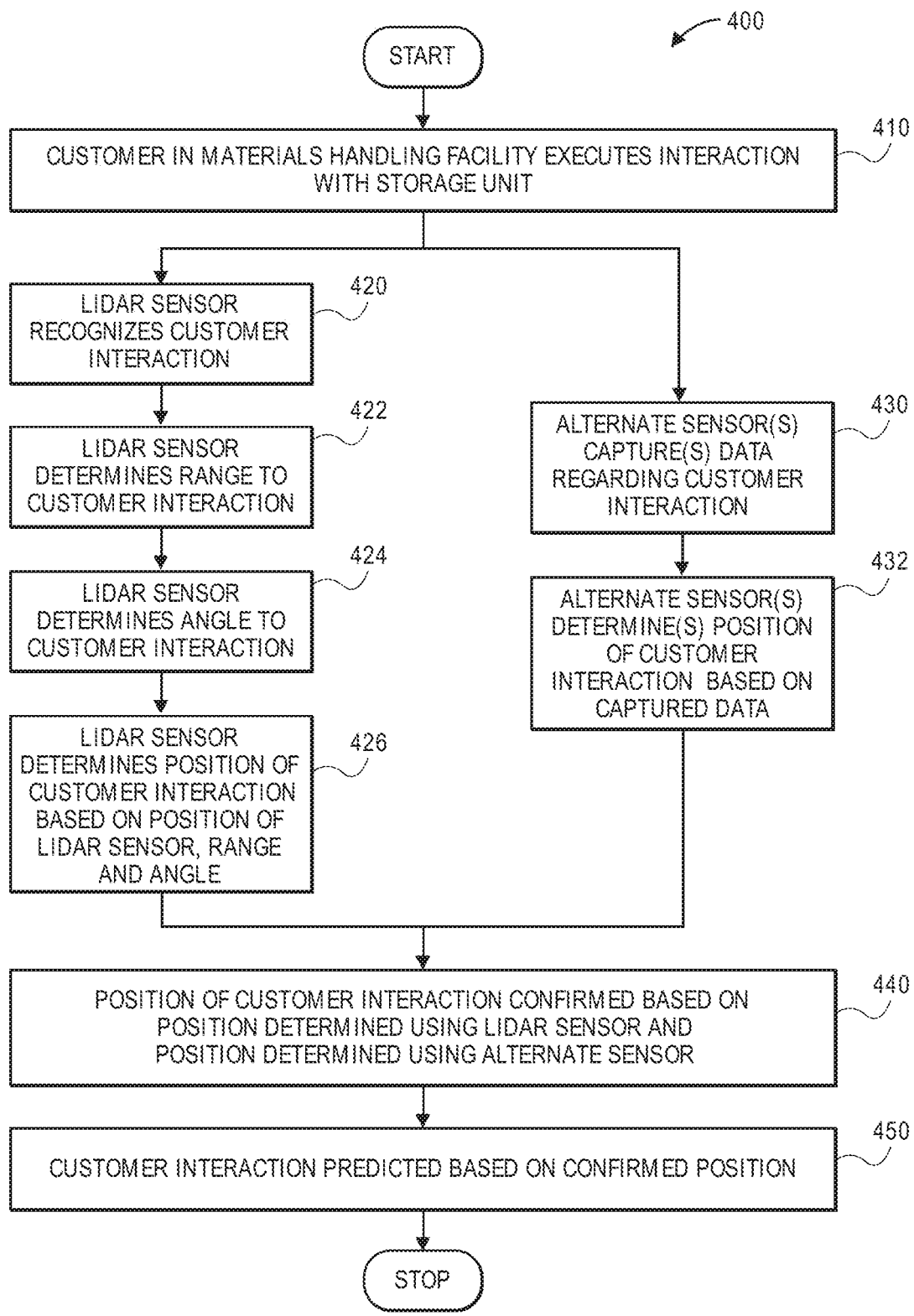
FIG. 4 is a flow chart of one process for detecting and/or locating interactions using one or more LIDAR devices, according to an implementation of the present disclosure.

Referring to FIG. 4, a flow chart 400 of an example process for detecting and/or locating interactions using one or more LIDAR devices, according to an implementation of the present disclosure is shown. At box 410, a customer in a materials handling facility executes an interaction with a storage unit. For example, referring again to FIGS. 1C and 1D, the customer may insert one or more body parts (e.g., an arm) into an opening or access area associated with a shelving unit or other storage unit at an inventory area at the materials handling facility. Alternatively, in other implementations, the interaction may be executed by someone who is not a customer, such as a worker or other human operator at the materials handling facility.

In parallel, information or data regarding the interaction with the storage unit is determined using two or more sensors, including at least one LIDAR device. At box 420, a LIDAR device recognizes that the customer interaction has occurred, such as by capturing information or data regarding a reflection of pulses or beams of laser light from one or more body parts involved in the interaction, or an item associated with the interaction. The pulses or beams may have been transmitted at any wavelength and at any intensity, in any number of directions, and at any transmission frequency. At box 422, the LIDAR device determines a range to the customer interaction. As is discussed above, when an elapsed time between a transmission of a pulse or beam by the LIDAR device and a receipt of the pulse or beam reflected from an object (e.g., a time of flight) is determined, a range between the LIDAR device and the object may be determined as one-half of a product of the speed of light and the elapsed time. At box 424, the LIDAR device determines an angle (or bearing) to the customer interaction, i.e., based on an angle or bearing from which the reflected pulses or beams are captured, which may be determined with respect to a standard axis or plane, such as horizontal or vertical, or any other axis or plane. At box 426, the LIDAR device (or one or more computer devices or resources associated with the LIDAR device) estimates a position of the customer interaction based on the position of the LIDAR device, the range determined at box 422, and the angle or bearing determined at box 424. For example, referring again to FIG. 3B, the position of the customer interaction may be estimated based on the position of the LIDAR device, the angle or bearing from which the reflected pulses or beams were captured, and the range or distance to the object from which the pulses or beams were reflected, e.g., according to one or more trigonometric functions such as a sine, a cosine, a tangent, or reciprocals thereof. In some implementations, the estimated position may be determined as a single point in space. Alternatively, in other implementations, such as is shown in FIG. 3B and FIG. 3C, the estimated position may be determined as an area of uncertainty including a sector or area (e.g., an annular sector) in space.

In real time or in near-real time, at box 430, an alternate sensor captures data regarding the customer interaction, and at box 432, the alternate sensor estimates a position of the customer interaction based on the captured data. The alternate sensor may be any type of sensor, including but not limited to an imaging device, a weight sensor (e.g., a scale) or another LIDAR device. For example, in some implementations, where the alternate sensor is an imaging device, the imaging device may be configured to capture visual imaging data, depth imaging data or any other type or form of imaging data, and a position of the customer interaction may be estimated based on the imaging data. Where visual imaging data depicts a specific object, or an object having a specific color, shape, size or visual attribute, the estimated position of the interaction may be a position where items having the color, the shape, the size or the other visual attribute are known to be stored. Where visual imaging data depicts one or more body parts of the customer, the estimated position of the interaction may be a position of the body parts of the customer, as shown in the imaging data. Similarly, where depth imaging data depicts a rapid reduction in depths with respect to background features, thereby suggesting an insertion of the body part of the customer, the estimated position of the interaction may be a location where the reduction in depth is sensed.

Alternatively, in other implementations, where the alternate sensor is a scale or other weight sensor associated with the storage unit, the estimated position may be a location where a change in weight is sensed, namely, in response to depositing one or more items at the storage unit, or removing one or more items from the storage unit. In still other implementations, the alternate sensor may be a second LIDAR device configured to capture an angle or a bearing to the customer interaction, and a range to the customer interaction. The position of the customer interaction may be estimated, such as in box 426, by determining an angle or bearing from which one or more reflected pulses or beams transmitted by the second LIDAR device were captured, such as in box 424, and a range or a distance from the second LIDAR device to the object from which such pulses or beams were reflected, such as in box 422, using a position of the second LIDAR device, e.g., according to one or more trigonometric functions.

At box 440, a position of the customer interaction is confirmed based on the estimated position determined using the LIDAR device at box 426 and the estimated position determined using the alternate sensor at box 432. If the estimated positions determined at box 426 and at box 432 are consistent with one another, e.g., if areas of uncertainty associated with such positions intersect or overlap to a sufficient extent, such as is shown in FIGS. 1D through 1G, then the customer interaction may be determined to have occurred at or within the intersecting or overlapping portions of such areas of uncertainty.

At box 450, the customer interaction is predicted based on the confirmed position determined at box 440, and the process ends. For example, where the customer interaction is determined to have occurred in a location associated with a portion of the storage unit storing or housing a specific item or type of item, then the customer interaction may be determined to involve or include one or more of the specific item or type of item stored or housed at that location. Moreover, a prediction of a customer interaction may be further enhanced using information or data captured by the LIDAR device or the alternate sensor. For example, where the confirmed position at which a customer interaction occurred is associated with a number of items having different colors, shapes, sizes or sizes, the identify, purpose or type of the customer interaction may be determined based on visual imaging data captured by one or more imaging devices, which may depict the colors, shapes or sizes of one or more items involved in the customer interaction. Similarly, where the confirmed position at which the customer interaction occurred is determined using depth imaging data captured by one or more imaging devices, or based on angles or bearings and distances determined by a LIDAR device, the depth imaging data and/or the angles or bearings and distances may define a profile of the body part of the customer, or of one or more items associated with the customer interaction. Any available information or data regarding the customer interaction, including angles or bearings and distances determined by the LIDAR device, or other information or data obtained by the alternate sensor, may be utilized in enhancing a prediction of the customer interaction that has been determined to occur at the confirmed position identified at box 440.

Figure 5A:
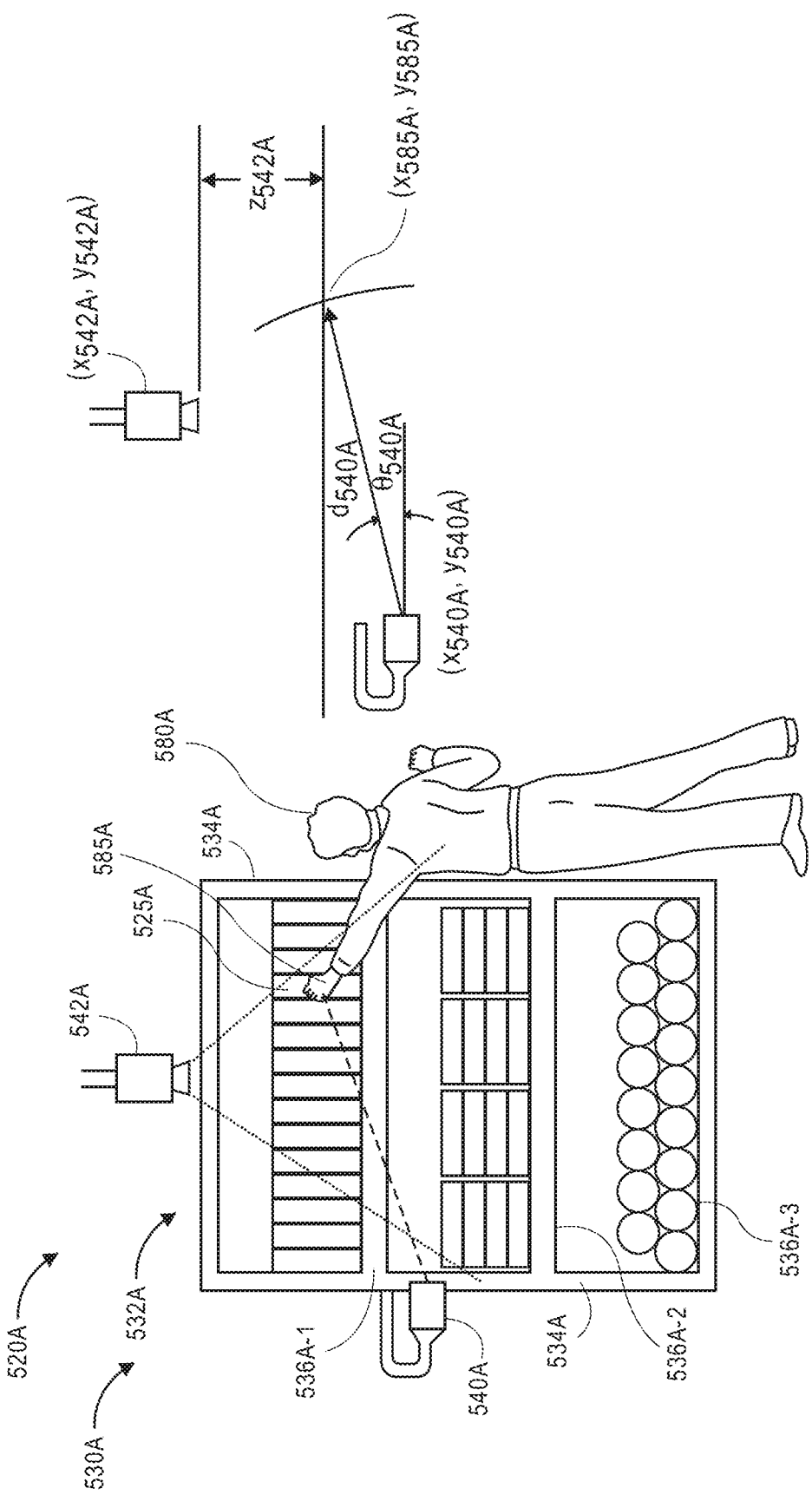
FIGS. 5A through 5B show components of a material handling facility configured for detecting and/or locating interactions using one or more LIDAR devices, according to an implementation of the present disclosure.
Figure 5B:
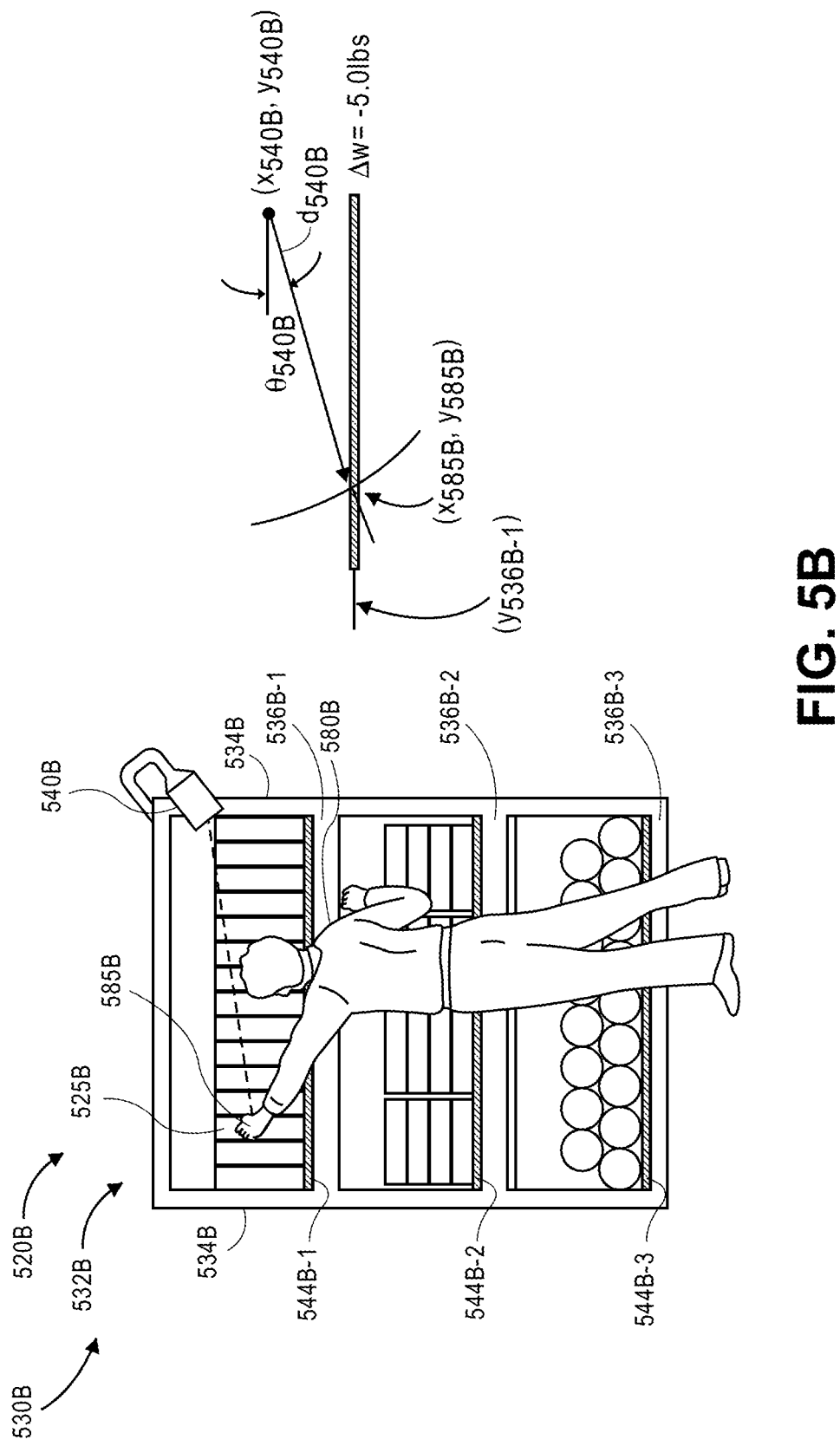

Referring to FIGS. 5A and 5B, components of materials handling facilities that are configured for detecting and/or locating interactions using one or more LIDAR devices according to an implementation of the present disclosure are shown. Except where otherwise noted, reference numerals preceded by the number "5" shown in FIGS. 5A and 5B indicate components or features that are similar to components or features having reference numerals preceded by the number "3" shown in FIGS. 3A through 3C, by the number "2" shown in FIG. 2 or by the number "1" shown in FIGS. 1A through 1G.

As is shown in FIG. 5A, a materials handling facility 520A includes an inventory area 530A, a LIDAR device 540A and an imaging device 542A. The inventory area 530A includes a storage unit 532A (e.g., a shelving unit) having a pair of supports 534A and a plurality of vertically coaligned shelves 536A-1, 536A-2, 536A-3 (or other loading surfaces). In some implementations, the shelves 536A-1, 536A-2, 536A-3 or other loading surfaces may be integrated into or rigidly joined to the supports 534A. Alternatively, in other implementations, the shelves 536A-1, 536A-2, 536A-3 may include one or more units that may be releasably placed onto or removed from the storage unit 532A, e.g., a gondola. The LIDAR device 540A is mounted laterally to one of the two supports 534A, and is aligned to transmit pulses or beams of laser light within a detection field that is parallel to and in front of an access area of the storage unit 532A, e.g., a frontal area of the storage unit 532A. The imaging device 542A may be a digital camera, a depth sensor or range camera, an infrared camera, or any other type or form of imaging device, and is mounted above the storage unit 532A, such that a portion of the inventory area 530A remains within a field of view.

A customer 580A (or a worker or other human operator) is standing in the inventory area 530A, near the storage unit 532A, within range of the LIDAR device 540A and beneath the imaging device 542A, within its field of view. As is shown in FIG. 5A, the customer 580A extends an arm 585A into the storage unit 532A to retrieve an item 525A from one of the plurality of shelves 536A-1, 536A-2, 536A-3 therein.

In accordance with some implementations of the present disclosure, information or data captured using the LIDAR device 540A and the imaging device 542A may be used to detect and locate an interaction by the customer 580A with one or more of the items maintained in the storage unit 532A. As is shown in FIG. 5A, the LIDAR device 540A may determine an angle or bearing $\theta_{540A}$ from the LIDAR device 540A to the arm 585A of the customer 580A, and a range or distance $d_{540A}$ from the LIDAR device 540A to the arm 585A. Therefore, a position ($x_{585A}$, $y_{585A}$) of the arm 585A of the customer 580A within a detection field defined by the LIDAR device 540A may be estimated based on a position ($x_{540A}$, $y_{540A}$) of the LIDAR device 540A, the angle or bearing $\theta_{540A}$ and the range or distance $d_{540A}$. As is also shown in FIG. 5A, where the imaging device 542A is a depth sensor, a range or distance $z_{542A}$ from the imaging device 542A to the arm 585A may be determined based on ranging information determined from depth imaging data captured by the imaging device 542A. Therefore, a position ($x_{585A}$, $y_{585A}$) of the arm 585A of the customer 580A may be estimated based on a position ($x_{542A}$, $y_{542A}$) of the imaging device 542A and the range or distance $z_{542A}$.

Where the respective estimates of the position ($x_{585A}$, $y_{585A}$) of the arm 585A determined by the LIDAR device 540A and the imaging device 542A are in common, or are sufficiently proximate to one another, such as where areas of uncertainty defined by the LIDAR device 540A and the imaging data 542A overlap at least in part, the interaction by the customer 580A may be presumed to have occurred at or near the position ($x_{585A}$, $y_{585A}$) of the arm 585A. For example, as is shown in FIG. 5A, the interaction may be presumed to have occurred at or near an intersection of an arc defined by the range or distance $d_{540A}$ from the LIDAR device 540A and the range or distance $z_{542A}$ determined by the imaging device 542A. Therefore, where the locations of individual items on the shelves 536A-1, 536A-2, 536A-3 are known, the item 525A may be identified based on its proximity to the position ($x_{585A}$, $y_{585A}$) of the arm 585A, and an interaction with the item 525A may be presumed to have taken place accordingly.

Similarly, as is shown in FIG. 5B, a materials handling facility 520B includes an inventory area 530B, a LIDAR device 540B and a plurality of weight sensors 544B-1, 544B-2, 544B-3. The inventory area 530B includes a storage unit 532B (e.g., a shelving unit) having a pair of supports 534B and a plurality of vertically coaligned shelves 536B-1, 536B-2, 536B-3 (or other loading surfaces). The LIDAR device 540B is mounted to the storage unit 532B at an upper corner defined by one of the supports 534B, and is aligned to transmit pulses or beams of laser light within a detection field that is parallel to and in front of an access area of the storage unit 532B, e.g., a frontal area of the storage unit 532B. The weight sensor 544B-1 is mounted in association with the shelf 536B-1, and is configured to sense loads or changes in loading on the shelf 536B-1. Similarly, the weight sensor 544B-2 is mounted in association with the shelf 536B-2, and the weight sensor 544B-3 is mounted in association with the shelf 536B-3, with the weight sensors 544B-2, 544B-3 configured to sense loads or changes in loading on the shelves 535B-2, 536B-3, respectively.

A customer 580B (or a worker or other human operator) is standing in the inventory area 530B, near the storage unit 532B, and within range of the LIDAR device 540B. As is shown in FIG. 5B, the customer 580B extends an arm 585B into the storage unit 532B to retrieve an item 525B from one of the plurality of shelves 536B-1, 536B-2, 536B-3 therein.

In accordance with some implementations of the present disclosure, information or data captured using the LIDAR device 540B and one or more of the weight sensors 544B-1, 544B-2, 544B-3 may be used to detect and locate an interaction by the customer 580B with one or more of the items maintained in the storage unit 532B. As is shown in FIG. 5B, the LIDAR device 540B may determine an angle or bearing $\theta_{540B}$ from the LIDAR device 540B to the arm 585B of the customer 580B, and a range or distance $d_{540B}$ from the LIDAR device 540B to the arm 585B. Therefore, a position ($x_{585B}$, $y_{585B}$) of the arm 585B of the customer 580B may be estimated based on a position ($x_{540B}$, $y_{540B}$) of the LIDAR device 540B, the angle or bearing $\theta_{585B}$ and the range or distance $d_{585B}$. As is also shown in FIG. 5B, a change in the loading on the shelf 536B-1, or $\Delta w_{536B-1}$, may be sensed by the weight sensor 544B-1 associated therewith. Therefore, a position ($x_{585B}$, $y_{585B}$) of the arm 585B of the customer 580B may be estimated based at least in part on a vertical position $y_{536B-1}$ of the shelf 536B-1.

Where estimates of the position ($x_{585B}$, $y_{585B}$) of the arm 585B determined by the LIDAR device 540B and the weight sensor 544B-1 are in common, or are sufficiently proximate to one another, the interaction by the customer 580B may be presumed to have occurred at or near the position ($x_{585B}$, $y_{585B}$) of the arm 585B. For example, as is shown in FIG. 5B, the interaction may be presumed to have occurred at or near an intersection of an arc defined by the range or distance $d_{540B}$ from the LIDAR device 540B and level $y_{536B-1}$ of the shelf 536B-1 where the change in loading $\Delta w_{536B-1}$ was sensed by the weight sensor 544B-1. Therefore, where the masses of individual items on the shelf 536B-1 are known, the item 525B may be identified based on its proximity to the position ($x_{585B}$, $y_{585B}$) of the arm 585B determined based on reflected beams captured using the LIDAR device 540B, and based on the change in the loading on the shelf 536B-1, or $\Delta w_{536B-1}$ sensed by the weight sensor 544B-1. Alternatively, the item 525B may be identified based on any other information or data, including but not limited to visual imaging data captured using one or more imaging devices (not shown in FIG. 5B), or based on beams reflected from outer surfaces of the item 525B, or on any other information or data.

In accordance with implementations of the present disclosure, information or data captured by a LIDAR device may be used to detect and locate an interaction with an item by a human operator independently, such as is shown in FIG. 3A through 3C, or in conjunction with information or data captured by one or more other sensors, including but not limited to the imaging device 542A shown in FIG. 5A or the weight sensors 544B-1, 544B-2, 544B-3 shown in FIG. 5B. Additionally, in some implementations of the present disclosure, information or data gathered by two LIDAR devices may be used to detect and locate an interaction with one or more items by a human operator, to identify the one or more items, or to classify the interaction accordingly.

Figure 6:
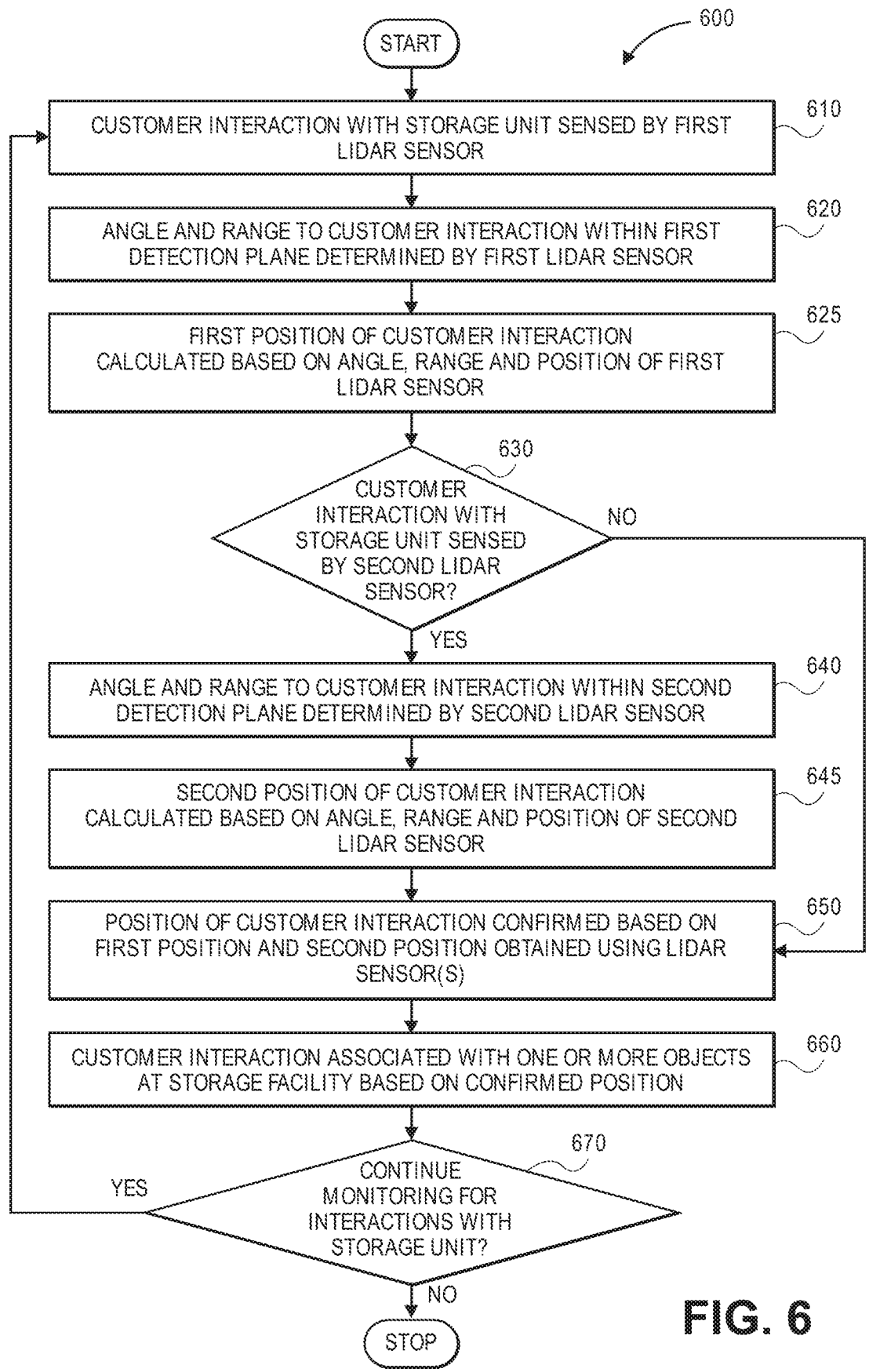
FIG. 6 is a flow chart of one process for detecting and/or locating interactions using one or more LIDAR devices, according to an implementation of the present disclosure.

Referring to FIG. 6, a flow chart 600 of an example process for detecting and/or locating interactions using one or more LIDAR devices according to an implementation of the present disclosure is shown. At box 610, a customer interaction with a storage unit is sensed by a first LIDAR device. For example, an arm or other body part of the customer may contact a plurality of pulses or beams of laser light transmitted by the first LIDAR device, and the pulses or beams of the laser light may be reflected back to the first LIDAR device.

At box 620, an angle and a range from the first LIDAR device to the customer interaction within a first detection field are determined by the first LIDAR device or, alternatively, by one or more associated computer devices or resources. For example, a range or distance to the arm or other body part of the customer may be estimated based on one-half of a product of a time in flight of one or more pulses or beams and the speed of light. Likewise, an angle or bearing from which the pulses or beams of the laser light were reflected, e.g., with respect to an axis or plane, may also be captured by the first LIDAR device, and this angle or bearing corresponds to a position of an object (such as the body part of the customer) from which the pulses or beams of the laser light were reflected. At box 625, a first estimate of the position of the customer interaction is calculated based on the angle and the range determined at box 620, and the position of the first LIDAR device. The first estimate may be calculated using trigonometric principles or functions, such as is shown in FIG. 3B, or in any other manner.

At box 630, whether the customer interaction with the storage unit is sensed by a second LIDAR device is determined. For example, where a storage unit such as the storage units 532A, 532B of FIGS. 5A and 5B are configured with two or more LIDAR devices that are permanently or releasably mounted to one or more shelves or supports for the storage unit, or in one or more locations within an inventory area, such as a ceiling, floor, column, beam or other feature, the customer interaction sensed by the first LIDAR device may also be sensed by one or more other LIDAR devices if the customer interaction is not blocked or otherwise occluded from such other LIDAR devices. If the customer interaction with the storage unit was not sensed by another LIDAR device, then the process advances to box 650, where a position of the customer interaction is determined based on the first estimate that was obtained using the first LIDAR device. For example, referring again to FIGS. 3A through 3C, the position of the customer interaction may be presumed to be located within an area of uncertainty defined by the angle and the range from the first LIDAR device to the arm or other body part of a customer, as well as tolerances associated with both the angle and the range.

If the customer interaction with the storage unit was sensed by a second LIDAR device, however, then the process advances to box 640, where an angle and a range from the second LIDAR device to the customer interaction within a second detection field are determined by the second LIDAR device or, alternatively, by one or more associated computer devices or resources. At box 645, a second estimate of the position of the customer interaction is calculated based on the angle and the range determined at box 640, and the position of the second LIDAR device. The second estimate may be calculated in the same manner as the first estimate at box 625, e.g., using trigonometric principles or functions, such as is shown in FIG. 3B, or in any other manner. At box 650, a position of the customer interaction is determined based on the first estimate obtained using the first LIDAR device and the second estimate obtained using the second LIDAR device. For example, referring again to FIGS. 1E through 1G, where areas of uncertainty defined by the respective angles and ranges from the first LIDAR device and the second LIDAR device to the arm or other body part of a customer overlap or are proximate to one another, the customer interaction may be presumed to have occurred where such areas of uncertainty overlap, or proximate to such areas of uncertainty.

At box 660, the customer interaction is associated with one or more objects at the storage unit based on the position determined at box 650, e.g., based on the first estimate, or on the first estimate and the second estimate. For example, where the first LIDAR device and/or the second LIDAR device are used to construct detection fields, and contact by a customer with one or both of the detection fields is detected and located, locations of the interaction by the customer with the detection fields may be associated with a corresponding item within close proximity to either or both of such locations, such as an item located nearby on a shelf or other element of the storage unit. Alternatively, where the storage unit includes one or more other sensors, including but not limited to imaging devices, weight sensors, or other LIDAR devices, information or data obtained by such sensors may be further utilized to determine locations of the customer interactions or to identify items associated with such interactions. At box 670, whether the storage unit is to be monitored for further interactions is determined. If the continued monitoring of the storage unit is desired, then the process returns to box 610, where another customer interaction with the storage unit is sensed by a first LIDAR device. If the continued monitoring of the storage unit is not desired, however, then the process ends.

Multiple LIDAR devices may be conveniently or strategically placed at, on, near or around inventory areas, e.g., storage areas having one or more storage units therein, and used to monitor for interactions with one or more customers, workers or other human operators. Referring to FIGS. 7A through 7E, components of a materials handling facility that is configured for detecting and locating interactions using one or more LIDAR devices, according to one implementation of the present disclosure are shown. Except where otherwise noted, reference numerals preceded by the number "7" shown in FIGS. 7A through 7E indicate components or features that are similar to components or features having reference numerals preceded by the number "5" shown in FIGS. 5A and 5B, by the number "3" shown in FIGS. 3A through 3C, by the number "2" shown in FIG. 2 or by the number "1" shown in FIGS. 1A through 1G.

Figure 7A:
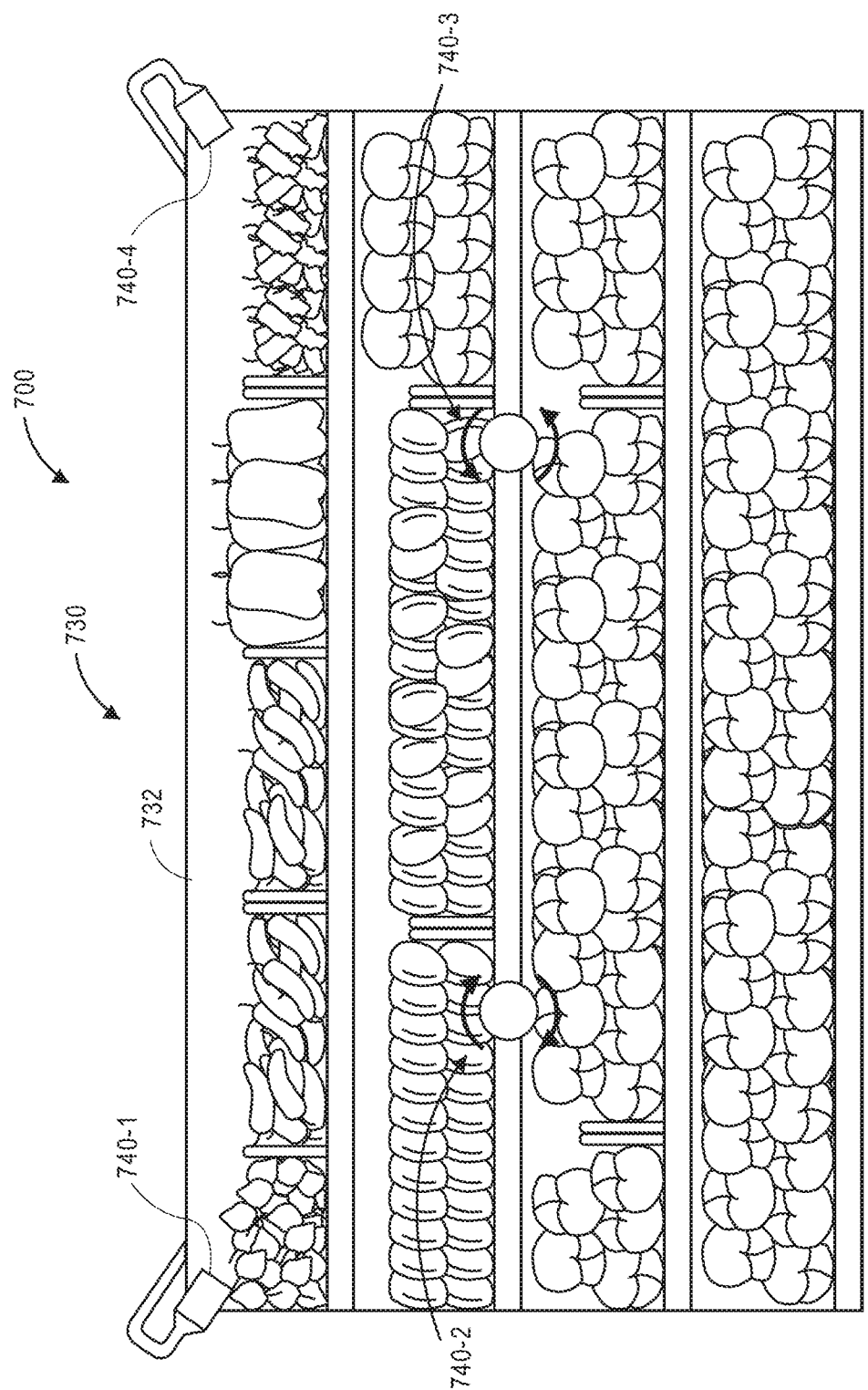
FIGS. 7A through 7E show components of a materials handling facility configured for detecting and locating interactions using one or more LIDAR devices, according to one implementation of the present disclosure.

As is shown in FIG. 7A, a materials handling facility 720 includes an inventory area 730 having a storage unit 732 (e.g., a shelving unit). The storage unit 732 includes a pair of vertical supports 734 and a plurality of shelves 736-1, 736-2, 736-3, 736-4 with inventory items (e.g., fresh produce) stored thereon. The storage unit 732 further includes a plurality of LIDAR devices 740-1, 740-2, 740-3, 740-4. Two of the LIDAR devices 740-1, 740-4 are mounted to opposite upper corners of the storage unit 732, and oriented to transmit pulses or beams of laser light in downward directions, e.g., in detection fields of finite or varying widths, and to receive reflections of the pulses or beams of the laser light from objects that come into contact with one or more of the detection fields. Such objects may include, but are not limited to, one or more body parts or items, such as items that are under the control of one or more of such body parts. The LIDAR devices 740-1, 740-4 are configured to transmit the pulses or beams in fields that are parallel to a frontal area of the storage unit 732 where access to the inventory items stored thereon may be obtained.

Figure 7B:
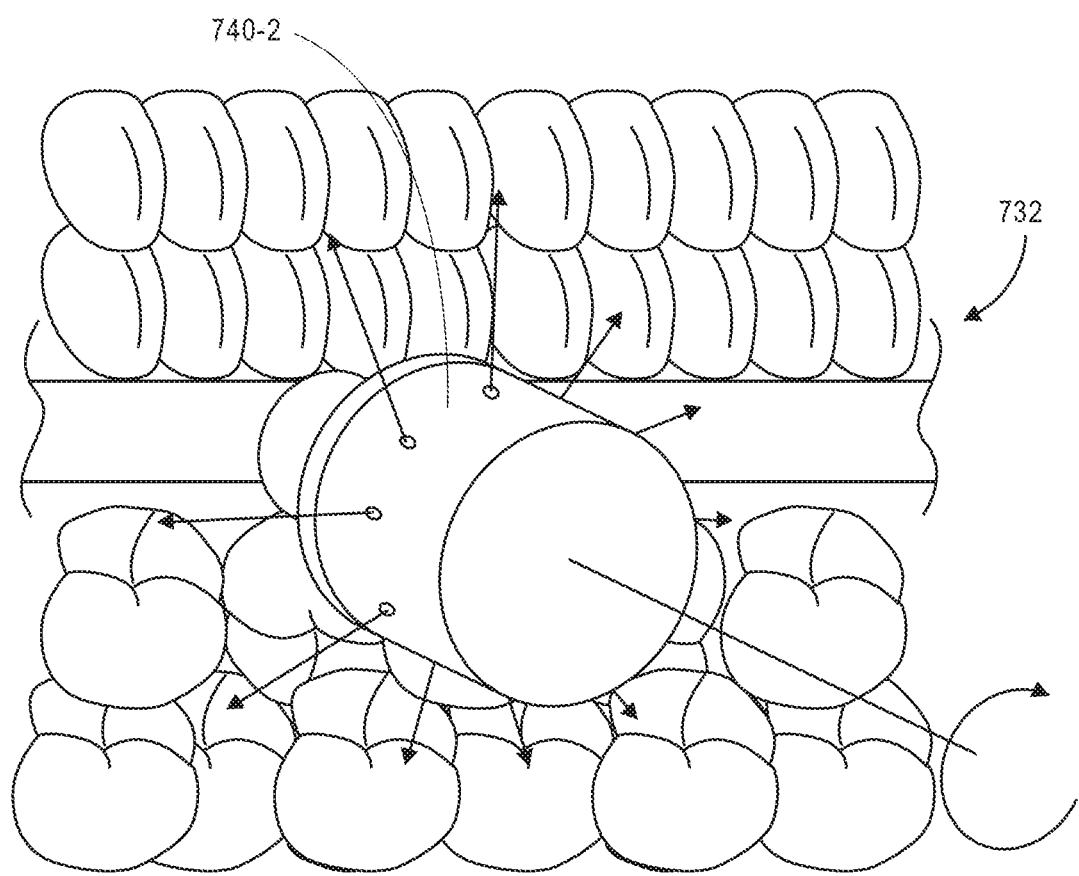

Additionally, two of the LIDAR devices 740-2, 740-3 are mounted to the shelf 736-2, and are configured to transmit pulses or beams of laser light in rotating directions, e.g., about outer circumferences of the LIDAR devices 740-2, 740-3, in detection fields of finite or varying widths, and to receive reflections of the pulses or beams of the laser light from objects that come into contact with one or more of the rotating detection fields. The LIDAR devices 740-2, 740-3 are, like the LIDAR devices 740-1, 740-4, configured to transmit the pulses or beams in fields that are parallel to the frontal area of the storage unit 732. As is shown in FIG. 7B, the LIDAR device 740-2 is mounted to the shelf 736-2 and configured to rotate freely, e.g., under power of one or more motors or rotational assemblies (not shown), while transmitting pulses or beams of laser light from outer circumferential surfaces of the LIDAR device 740-2. Alternatively, the LIDAR device 740-2 may be fixed in position about the axis, yet may be controlled, clocked or otherwise configured to transmit pulses or beams of laser light in a rotating fashion from the outer surfaces of the LIDAR device 740-2. The LIDAR device 740-3, which is also mounted to the shelf 736-2, may operate in a similar manner to the LIDAR device 740-2, and may transmit pulses or beams while rotating in the same rotational direction as the LIDAR device 740-2, or in an opposite rotational direction.

The placement of the LIDAR devices 740-1, 740-2, 740-3, 740-4 at the storage unit 732 may be selected in order to maximize the probability that two or more of the LIDAR devices 740-1, 740-2, 740-3, 740-4 will detect interactions with items stored at the storage unit 732, to locate such interactions based on information or data captured by the LIDAR devices 740-1, 740-2, 740-3, 740-4, including angles or bearings to objects within detection fields generated by such sensors, or ranges or distances to such objects. Moreover, because approximately half of the inventory that is stored at the storage unit 732 is located above the shelf 736-2, and approximately half of the inventory is stored below the shelf 736-2, the rotating LIDAR device 740-2 is strategically placed and equally likely to capture information or data regarding interactions with the storage unit 732, regardless of whether such interactions occur above or below the shelf 736-2.

Although the storage unit 732 includes four LIDAR devices 740-1, 740-2, 740-3, 740-4, an inventory area may include any number of LIDAR devices, or other sensors, which may be oriented or configured in any manner with respect to faces or other access points of storage units therein. For example, the storage unit 732 might include additional LIDAR devices that are fixed above the shelves 736-1, 736-2, 736-3, 736-4 and oriented to transmit pulses or beams of light downward and toward one or more customers or other personnel within a vicinity of the storage unit 732. Alternatively, a fixed LIDAR device, such as the LIDAR devices 740-1, 740-4, or a rotating LIDAR device, such as the LIDAR devices 740-2, 740-3, may be mounted to any other structural feature within the inventory area 730, including but not limited to one or more of the other shelves 736-1, 736-3, 736-4. The number, configuration and/or orientation of the LIDAR devices that may be utilized within inventory areas of materials handling facilities are not limited to any of the implementations thereof shown here. Similarly, the LIDAR devices of the present disclosure are not limited to any specific wavelengths (or frequencies), power levels (or intensities), or transmission frequencies.

Figure 7C:
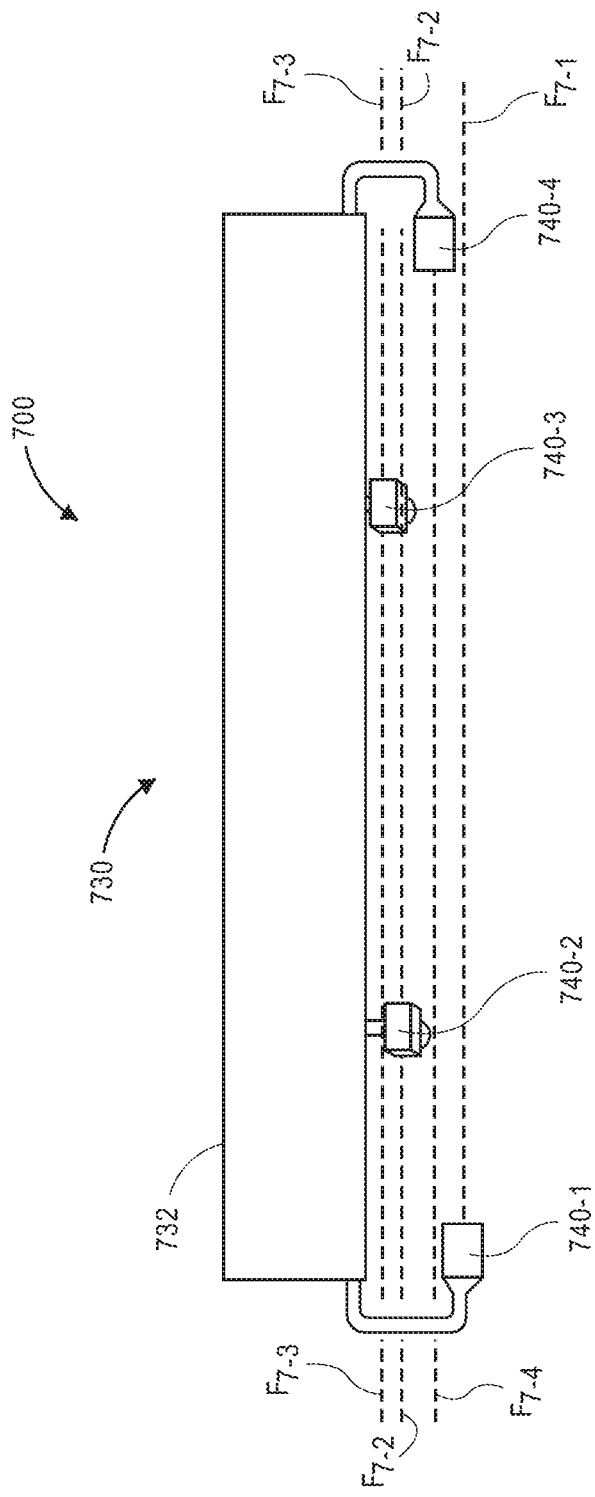
Figure 7D:
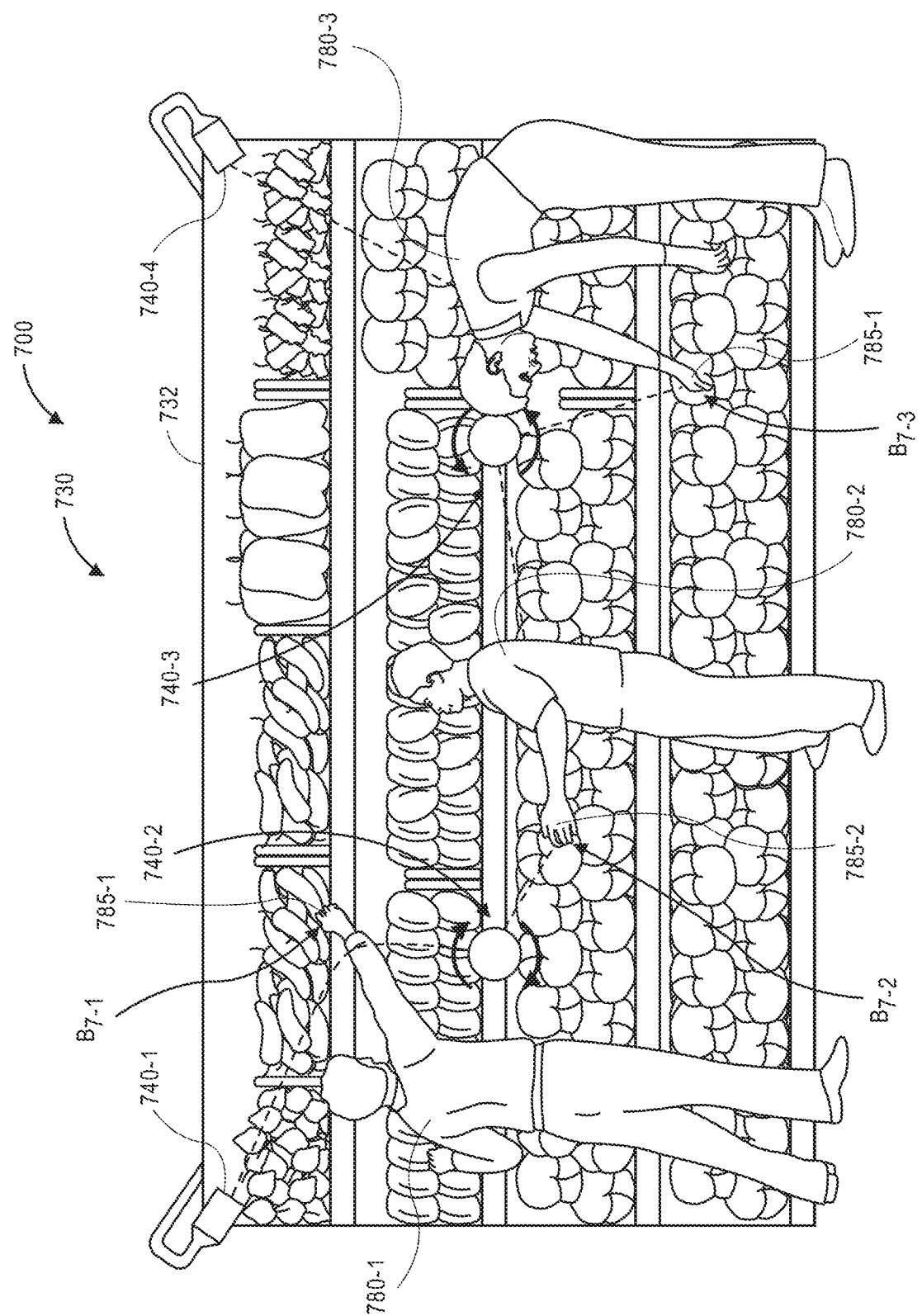

As is discussed above, LIDAR devices may be used to generate two or more detection fields that are oriented or aligned at any angle, including but not limited to horizontal fields, vertical fields, fields that are oriented at any angle, or fields that are parallel to one another. As is shown in FIG. 7C, each of the LIDAR devices 740-1, 740-2, 740-3, 740-4 is shown as transmitting pulses or beams in detection fields $F_{7-1}$, $F_{7-2}$, $F_{7-3}$, $F_{7-4}$ that are parallel to one another. The LIDAR device 740-1 and the LIDAR device 740-4 are shown as transmitting pulses or beams within fields $F_{7-1}$, $F_{7-4}$ that are fixed with respect to one another, while the LIDAR devices 740-2, 740-3 are shown as transmitting pulses or beams in a rotating fashion within fields $F_{7-2}$, $F_{7-3}$ that are fixed with respect to one another. Therefore, when a user (e.g., a customer, a worker or a human operator) intends to retrieve an item from the storage unit 732, the user must first breach the field $F_{7-1}$ generated by the LIDAR device 740-1 before breaching the field $F_{7-4}$ generated by the LIDAR device 740-4, the field $F_{7-2}$ generated by the LIDAR device 740-2 and the field $F_{7-3}$ generated by the LIDAR device 740-3 in order to access the item within the storage unit 732. Conversely, when retrieving the item from the storage unit 732, the user and the item will first breach the field $F_{7-3}$ generated by the LIDAR device 740-3 before breaching the field $F_{7-2}$ generated by the LIDAR device 740-2, the field $F_{7-4}$ generated by the LIDAR device 740-4 and the field $F_{7-1}$ generated by the LIDAR device 740-1. Positions corresponding to such breaches may be detected by each of the respective LIDAR devices 740-1, 740-2, 740-3, 740-4 based on angles or bearings from such sensors to such breaches, distances from such sensors to such breaches, and positions of such sensors, e.g., using trigonometric principles or functions. Moreover, where a user breaches two or more fields in parallel, positions corresponding to such breaches may be used to define a vector of the user's movement (e.g., a path traveled by a body part such as a hand of the user) to interact with an item therein. Such a vector or path may be further relied upon in locating and identifying an item with which the user interacted according to the present disclosure As is shown in FIG. 7D, the configuration of the materials handling facility 720, and the distribution of the LIDAR devices 740-1, 740-2, 740-3, 740-4 therein, permit interactions with the materials handling facility 720 by any number of customers, workers or other human operators to be detected and located accordingly. For example, as is shown in FIG. 7D, a customer 780-1 executes a breach $B_{7\text{-}1}$ of the fields $F_{7\text{-}1}$, $F_{7\text{-}2}$, $F_{7\text{-}3}$, $F_{7\text{-}4}$ by extending a hand 785-1 into the storage unit 732 to search for one or more items of produce that is stored on the shelf 736-1, while a customer 780-2 executes a breach $B_{7\text{-}1}$ of the fields $F_{7\text{-}1}$, $F_{7\text{-}2}$, $F_{7\text{-}3}$, $F_{7\text{-}4}$ by extending a hand 785-2 into the storage unit 732 in order to inspect an item of produce that is stored on the shelf 736-3, and a customer 780-3 executes a breach $B_{7\text{-}1}$ of the fields $F_{7\text{-}1}$, $F_{7\text{-}2}$, $F_{7\text{-}3}$, $F_{7\text{-}4}$ by extending a hand 785-3 into the storage unit 732 in order to retrieve an item of produce from the shelf 736-4.

Figure 7E:
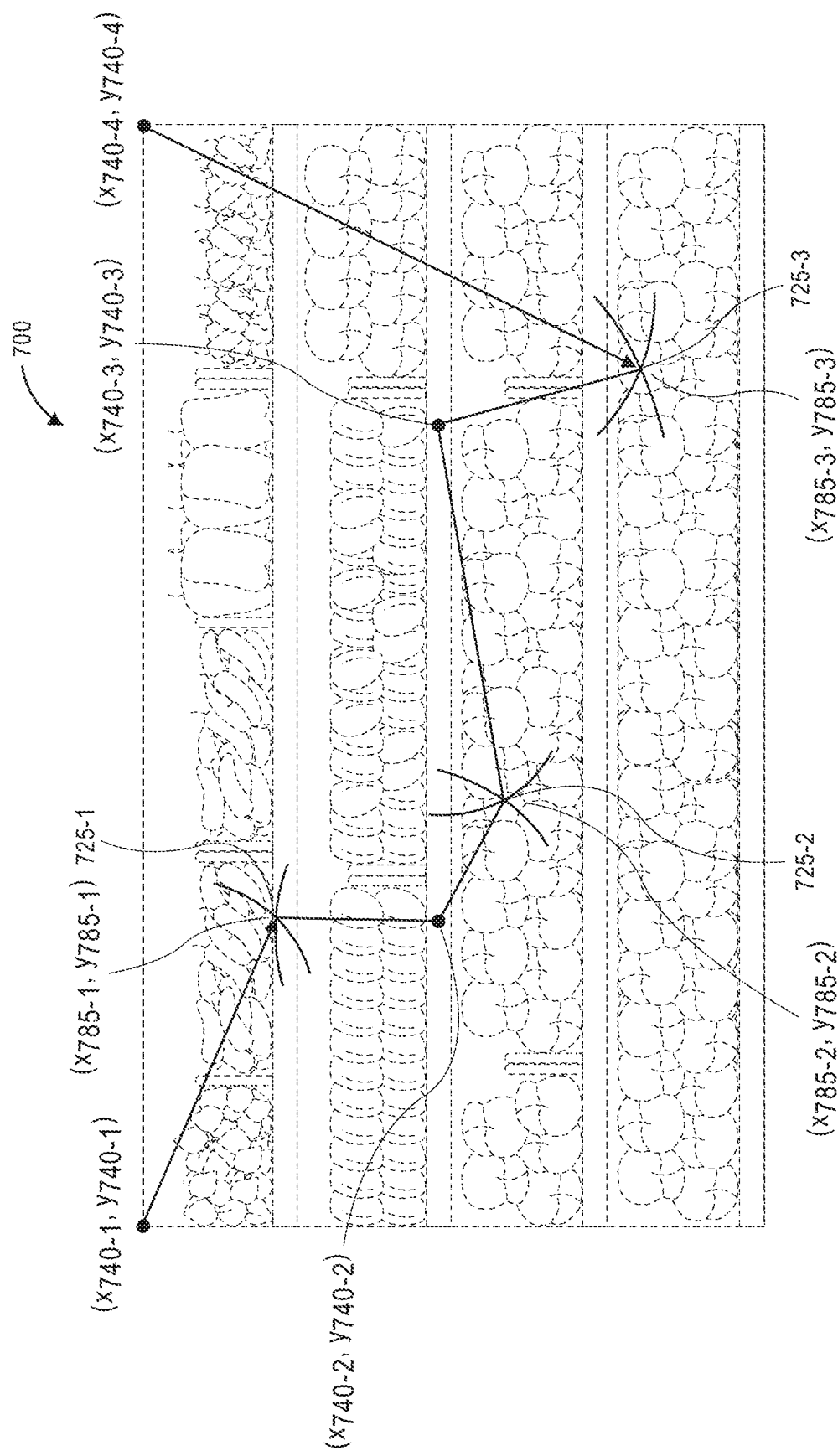

Each of the interactions with the storage unit 732 by the customers 780-1, 780-2, 780-3 occurs within an operating range of one or more of the LIDAR devices 740-1, 740-2, 740-3, 740-4, and may be detected and located accordingly. As is shown in FIG. 7E, the customer 780-1 may be determined to have searched for an item 725-1, e.g., a sweet potato, at a location $(x_{785\text{-}1}, y_{785\text{-}1})$ on the shelf 736-1, based on angles and ranges to contact by the customer 780-1 with pulses or beams that were transmitted by the LIDAR device 740-1 and the LIDAR device 740-2, e.g., angles or ranges from the position $(x_{740\text{-}1}, y_{740\text{-}1})$ of the LIDAR device 740-1 and the position $(x_{740\text{-}2}, y_{740\text{-}2})$ of the LIDAR device 740-2, as well as any information regarding locations of inventory items on the storage unit 732, which may be correlated with the locations of the contact with the pulses or beams.

Similarly, the customer 780-2 may be determined to have inspected an item 725-2, e.g., a green pepper, at a location $(x_{785\text{-}2}, y_{785\text{-}2})$ on the shelf 736-3, based on angles and ranges to contact by the customer 780-2 with pulses or beams that were transmitted by the LIDAR device 740-2 and the LIDAR device 740-3, e.g., angles or ranges from the position $(x_{740\text{-}2}, y_{740\text{-}2})$ of the LIDAR device 740-2 and the position $(x_{740\text{-}3}, y_{740\text{-}3})$ of the LIDAR device 740-3, as well as information regarding locations of inventory items on the storage unit 732. The customer 780-3 may be determined to have retrieved an item 725-3, e.g., a red pepper, from a location $(x_{785\text{-}3}, y_{785\text{-}3})$ on the shelf 736-4, based on angles and ranges to contact by the customer 780-3 with pulses or beams that were transmitted by the LIDAR device 740-3 and the LIDAR device 740-4, e.g., angles or ranges from the position $(x_{740\text{-}3}, y_{740\text{-}3})$ of the LIDAR device 740-3 and the position $(x_{740\text{-}4}, y_{740\text{-}4})$ of the LIDAR device 740-4, as well as information regarding locations of inventory items on the storage unit 732.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed to achieve the same function(s) and/or result(s) described herein and which are included within the scope of the present disclosure. For example, although some of the implementations described herein or shown in the accompanying figures refer to the use of LIDAR devices with imaging devices and/or weight sensors that are provided in fulfillment centers, the systems and methods disclosed herein are not so limited, and utilize any type of imaging device that is applied in any environment and used for any purpose. While some of the implementations disclosed herein are described as including a single LIDAR device mounted at a materials handling facility and pointed toward one or more storage units within an inventory area, those of ordinary skill in the pertinent art will recognize that the systems and methods disclosed herein may utilize any number of LIDAR devices, imaging devices and/or weight sensors of any type or form, and provided in any configuration or orientation.

Additionally, while many of the implementations disclosed herein are directed to determining an action or an activity performed by a human actor, those of ordinary skill in the pertinent arts will readily recognize that such systems and methods may be further utilized to determine actions or activities performed by non-human actors, such as any other animals, as well as machinery, equipment, robotics or the like.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not intended to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), physical or wireless, mechanical, chemical, optical, analog, digital or electrical.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 4 or 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be implemented directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A materials handling facility comprising:
   an inventory area having a shelving unit with a plurality of shelves, wherein a frontal area of the shelving unit is configured for access by at least one user;
   a first sensor mounted in association with the shelving unit, wherein the first sensor comprises a first light detection and ranging (LIDAR) device configured to transmit laser light in a first field that is parallel to the frontal area of the shelving unit and to receive at least some of the laser light reflected from one or more objects within the first field;
   a second sensor mounted in association with the shelving unit; and
   a computing device comprising a memory and at least one processor, wherein the computing device is in communication with at least the first sensor and the second sensor, and
   wherein the at least one processor is configured to at least:
      determine information regarding a geometric arrangement of the materials handling facility, wherein the information comprises at least a height, a length or a width of the frontal area of the shelving unit;
      cause the first sensor to transmit laser light within the first field;
      receive, by the first sensor, laser light reflected from a first body part of the at least one user within the first field;
      determine a first range from the first sensor to the first body part within the first field based at least in part on at least the reflected laser light;
      determine a first angle from the first sensor to the first body part within the first field with respect to a horizontal axis based at least in part on at least the reflected laser light;
      determine a first position of the first body part within the first field based at least in part on a position of the first sensor, the first range and the first angle;
      determine, by the second sensor, information regarding the first body part;
      determine a second position of the first body part based at least in part on the information regarding the first body part;
      determine that the first position of the first body part is consistent with the second position of the first body part;
      in response to determining that the first position of the first body part is consistent with the second position of the first body part,
         identify an item on one of the plurality of shelves based at least in part on the geometric arrangement of the materials handling facility, wherein the item is proximate to at least one of the first position or the second position; and
         determine that an interaction involving the first body part and the item has occurred.

2. The materials handling facility of claim 1, wherein the at least one processor is further configured to at least:
   determine a first horizontal distance within the first field from the first LIDAR device to the first body part based at least in part on a product of the first range and a cosine of the first angle; and
   determine a first vertical distance within the first field from the first LIDAR device to the first body part based at least in part on a product of the first range and a sine of the first angle, wherein the first position of the first body part is located at the first horizontal distance and the first vertical distance from the position of the first sensor.

3. The materials handling facility of claim 1, wherein the second sensor is a weight sensor associated with the one of the plurality of shelves, and wherein the at least one computer processor is further configured to at least:

determine a change in a load on the one of the plurality of shelves by the weight sensor, wherein the information regarding the first body part determined by the second sensor comprises the change in the load on the one of the plurality of shelves;

determine a vertical height of the one of the plurality of shelves, wherein the second position of the first body part is determined based at least in part on the vertical height of the one of the plurality of shelves; and determine an identity of the item based at least in part on the change in the load, wherein that the interaction involving the first body part and the item has occurred is determined based at least in part on the change in the load and the identity of the item.

4. The materials handling facility of claim 1, wherein the second sensor is an imaging device configured to include at least a portion of the frontal area of the shelving unit within a field of view, and wherein the at least one computer processor is further configured to at least:

capture imaging data regarding at least the portion of the frontal area of the shelving unit, wherein the information regarding the first body part determined by the second sensor comprises the imaging data; and determine a second range from the second sensor to the first body part based at least in part on the imaging data, wherein the second position of the first body part is determined based at least in part on the second range, and wherein the imaging data comprises at least one of:
depth imaging data including the second range; or
color imaging data depicting at least one of a color, a texture or an outline of the first body part.

5. A method comprising:

transmitting first light by a first light detection and ranging (LIDAR) device, wherein the first light is transmitted within a first detection field associated with at least one access area of a storage unit, and wherein at least a portion of the first detection field is parallel to at least a portion of the at least one access area of the storage unit;

receiving second light by the first LIDAR device at a first time, wherein the second light is reflected by a first object within the first detection field;

determining, by at least one computer processor, a first angle from the first LIDAR device to the first object within the first detection field based at least in part on the second light;

determining, by at least one computer processor, a first distance between the first LIDAR device and the first object within the first detection field based at least in part on the second light;

determining, by the at least one computer processor, a first position of the first object based at least in part on the first angle and the first distance; and determining, by the at least one computer processor, that an interaction between the first object and a second object has occurred based at least in part on the first position of the first object.

6. The method of claim 5, wherein determining the first distance between the first LIDAR device and the first object within the first detection field comprises:

determining, by the first LIDAR device, a time between a transmission of the first light by the first LIDAR device and a receipt of the second light by the first LIDAR device;

determining, by the at least one computer processor, a product of the time and a speed of light; and calculating the first distance by the at least one processor, wherein the first distance is one-half of the product.

7. The method of claim 5, wherein the first object is a body part of a human operator, and wherein the second object is one of a plurality of consumer goods in the storage unit.

8. The method of claim 5, wherein determining that the interaction between the first object and the second object has occurred comprises:

identifying information regarding a second position of the second object in the storage unit at the first time; and determining that the first position of the first object is proximate to the second position of the second object.

9. The method of claim 8, wherein the first object is a body part of a human operator, and wherein the method further comprises:

determining information regarding at least one of the human operator or the second object by a second sensor, wherein the second sensor is at least one of an imaging device, a weight sensor or a second LIDAR device;

determining an identity of at least one of the human operator or the second object based at least in part on the determined information; and determining that the interaction is at least one of a picking of the second object from the second location of the storage unit at the first time by the human operator or a placement of the second object at the storage unit at the first time by the human operator based at least in part on the determined information, wherein the determined information comprises at least one of:

visual imaging data depicting at least a portion of at least one of the human operator or the second object;

depth imaging data comprising a range between the second sensor and at least one of the body part of the human operator or the second object;

a change in mass on at least one loading surface of the storage unit;

a mass of the second object; or a second angle from the second LIDAR device to the first object within a second detection field and a second distance between the second LIDAR device and the first object within the second detection field.

10. The method of claim 5, wherein the first angle from the first LIDAR device to the first object within the first detection field is determined by a first computer processor of the first LIDAR device, wherein the first distance between the first LIDAR device and the first object within the first detection field is determined by the first computer processor, wherein the first position of the first object within the first detection field is determined by a second computer processor of a second computer device in communication with the first LIDAR device, and
wherein that the interaction between the first object and the second object has occurred is determined by the second computer processor.

11. The method of claim 5, further comprising:
determining an update to an inventory record based at least in part on the interaction between the first object and the second object by the at least one computer processor, wherein the update to the inventory record comprises an increase in a number of the second object at the storage unit or a decrease in the number of the second object at the storage unit, and
storing the update to the inventory record in at least one data store.

12. The method of claim 5, wherein determining the first position of the first object within the first detection field comprises:
determining, by the at least one computer processor, a second distance between a position of the first LIDAR device and the first position of the first object along a first axis within the first detection field according to a first trigonometric function, wherein the second distance is determined based at least in part on the first angle and the first distance;
determining, by the at least one computer processor, a third distance between the position of the first LIDAR device and the first position of the first object along a second axis within the first detection field according to a second trigonometric function, wherein the third distance is determined based at least in part on the first angle and the first distance; and
determining the first position of the first object based at least in part on the second distance and the third distance,
wherein the first angle is defined with respect to one of the first axis or the second axis.

13. The method of claim 5, wherein determining the first position of the first object within the first detection field comprises:
capturing information regarding at least one of the first object or the second object using a second sensor associated with the storage unit,
wherein that the interaction between the first object and the second object has occurred is determined based at least in part on the information regarding the at least one of the first object or the second object.

14. The method of claim 13, wherein the second sensor is an imaging device, and
wherein capturing the information regarding the at least one of the first object or the second object using the second sensor associated with the storage unit comprises:
capturing imaging data of at least a portion of the first object or the second object by the imaging device; and
at least one of:
determining a range between the imaging device and the first object or the second object based at least in part on the imaging data by the at least one computer processor; or
recognizing at least one of an edge, a contour, an outline, a color, a texture, a silhouette or a shape of at least a portion of the second object based at least in part on the imaging data by the at least one computer processor,
wherein that the interaction between the first object and the second object has occurred is determined based at least in part on at least one of:
the range between the imaging device and the first object or the second object; or
the at least one of the edge, the contour, the outline, the color, the texture, the silhouette or the shape of the second object.

15. The method of claim 13, wherein the second sensor is a weight sensor associated with at least one loading surface of the storage unit,
wherein capturing the information regarding the at least one of the first object or the second object using the second sensor associated with the storage unit comprises:
determining at least one of a load on the loading surface or a change in the load on the loading surface by the weight sensor; and
determining an identity of the second object based at least in part on the load on the loading surface or the change in the load on the loading surface by the at least one computer processor, and
wherein that the interaction between the first object and the second object has occurred is determined based at least in part on at least one of:
the load on the loading surface;
the change in the load on the loading surface; or
the identity of the second object.

16. The method of claim 13, wherein the second sensor is a second LIDAR device, and
wherein capturing the information regarding the at least one of the first object or the second object using the second sensor associated with the storage unit comprises:
transmitting third light by the second LIDAR device, wherein the third light is transmitted within a second detection field associated with the at least one access area of the storage unit; and
receiving fourth light by the second LIDAR device at approximately the first time, wherein the fourth light is reflected by the first object within the second detection field,
wherein the method further comprises:
determining, by the at least one computer processor, a second angle from the second LIDAR device to the first object within the second detection field based at least in part on the fourth light;
determining, by the at least one computer processor, a second distance between the second LIDAR device and the first object within the second detection field based at least in part on the fourth light; and
determining, by the at least one computer processor, a second position of the first object based at least in part on the second angle and the second distance, and
wherein that the interaction between the first object and the second object has occurred is determined based at least in part on the first position of the first object and the second position of the first object.

17. The method of claim 5, wherein the first LIDAR device is rotatably mounted to at least a portion of the storage unit,
wherein the first LIDAR device is configured to rotate about an axis, and
wherein the first LIDAR device is configured transmit at least the first light radially outward from the first LIDAR device in directions perpendicular to the axis.

18. The method of claim 5, wherein the first light comprises laser beams transmitted at an infrared wavelength and a power level of less than three milliwatts, and wherein the laser beams are transmitted at a rate of at least ten thousand beams per second.

19. A storage unit comprising:
a plurality of loading surfaces;
a first LIDAR device configured to transmit laser light within a first field and to receive laser light within the first field, wherein the first field is parallel to a frontal area of the storage unit;
a second LIDAR device configured to transmit laser light within a second field and to receive reflected laser light within the second field, wherein the second field is parallel to the first field and the frontal area; and
a computing resource in communication with the first LIDAR device and the second LIDAR device,
wherein the computing resource comprises at least one computer processor that is configured to at least:
cause the first LIDAR device to transmit laser light within the first field at a transmission frequency of at least ten thousand beams per second;
determine first information regarding laser light reflected by a first object within the first field and captured by the first LIDAR device, wherein the first information includes at least:
a first angle from which the laser light was reflected by the first object within the first field and captured by the first LIDAR device; and
a first range from the first LIDAR device to the first object within the first field;
cause the second LIDAR device to transmit laser light beams within the second field at a transmission frequency of at least ten thousand beams per second;
determine second information regarding laser light reflected by the first object within the second field and captured by the second LIDAR device, wherein the second information includes at least:
a second angle from which the laser light was reflected by the first object within the second field and captured by the second LIDAR device; and
a second range from the second LIDAR device to the first object within the second field;
determine, based at least in part on the first information, a first position of a first portion of the first object within the first field;
determine, based at least in part on the second information, a second position of a second portion of the first object within the second field;
identify a second object on one of the plurality of loading surfaces based at least in part on the first position and the second position, wherein a third position of the second object on the one of the plurality of loading surfaces is proximate to at least one of the first position or the second position; and
determine that an interaction between the first object and the second object has occurred based at least in part on the third position and at least one of the first position and the second position.

20. The storage unit of claim 19, wherein the first LIDAR device is mounted to at least one of the plurality of vertically coaligned loading surfaces, and
wherein the first LIDAR device is configured to transmit the laser light within the first field in directions extending radially from the first LIDAR device.

* * * * *